(12) United States Patent
Ding et al.

(10) Patent No.: US 9,269,127 B2
(45) Date of Patent: Feb. 23, 2016

(54) DE-NOISING OF REAL-TIME DYNAMIC MAGNETIC RESONANCE IMAGES BY THE COMBINED APPLICATION OF KARHUNEN-LOEVE TRANSFORM (KLT) AND WAVELET FILTERING

(71) Applicant: Ohio State Innovation Foundation, Columbus, OH (US)

(72) Inventors: Yu Ding, Columbus, OH (US); Prashanth Palaniappan, Folsom, CA (US); Orlando P. Simonetti, Columbus, OH (US)

(73) Assignee: Ohio State Innovation Foundation, Columbus, OH (US)

(*) Notice: Subject to any disclaimer, the term of this patent is extended or adjusted under 35 U.S.C. 154(b) by 70 days.

(21) Appl. No.: 14/169,106

(22) Filed: Jan. 30, 2014

(65) Prior Publication Data

US 2014/0212015 A1 Jul. 31, 2014

Related U.S. Application Data

(60) Provisional application No. 61/759,119, filed on Jan. 31, 2013.

(51) Int. Cl.
*G06K 9/00* (2006.01)
*G06T 5/00* (2006.01)
*G06T 5/50* (2006.01)
*A61B 5/05* (2006.01)

(52) U.S. Cl.
CPC . *G06T 5/002* (2013.01); *G06T 5/50* (2013.01); *G06T 2207/10076* (2013.01); *G06T 2207/20064* (2013.01); *G06T 2207/20182* (2013.01); *G06T 2207/30048* (2013.01)

(58) Field of Classification Search
CPC .................................. G06T 5/00; H04N 1/00
USPC ......... 382/128, 129, 130, 131, 132, 133, 134; 600/407, 410, 411, 425, 427
See application file for complete search history.

(56) References Cited

U.S. PATENT DOCUMENTS

| | | | | |
|---|---|---|---|---|
| 5,534,925 A | * | 7/1996 | Zhong | 348/384.1 |
| 8,675,942 B2 | * | 3/2014 | Chang | G01R 33/4824 382/131 |
| 2002/0002455 A1 | * | 1/2002 | Accardi et al. | 704/226 |

* cited by examiner

*Primary Examiner* — Abolfazl Tabatabai
(74) *Attorney, Agent, or Firm* — Meunier Carlin & Curfman LLC

(57) ABSTRACT

A hybrid filtering method called Karhunen Loeve Transform-Wavelet (KW) filtering is presented to de-noise dynamic cardiac magnetic resonance images that simultaneously takes advantage of the intrinsic spatial and temporal redundancies of real-time cardiac cine. This filtering technique combines a temporal Karhunen-Loeve transform (KLT) and spatial adaptive wavelet filtering. KW filtering has four steps. The first is applying the KLT along the temporal direction, generating a series of "eigenimages". The second is applying Marcenko-Pastur (MP) law to identify and discard the noise-only eigenimages. The third applying a 2-D spatial wavelet filter with adaptive threshold to each eigenimage to define the wavelet filter strength for each of the eigenimages based on the noise variance and standard deviation of the signal. Lastly, the inverse KLT is applied to the filtered eigenimages to generate a new series of cine images with reduced image noise.

30 Claims, 26 Drawing Sheets

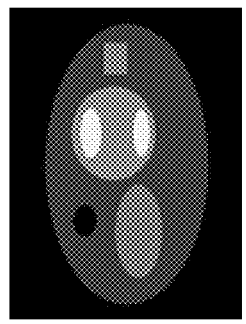 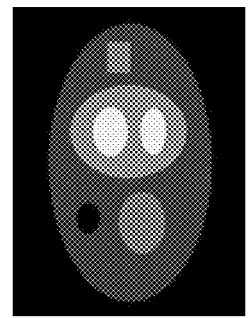
*FIG. 6A*  *FIG. 6B*
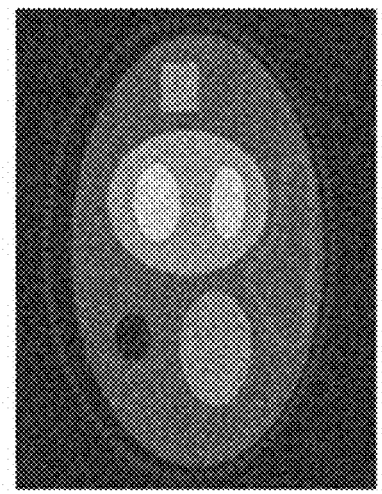
*FIG. 7*

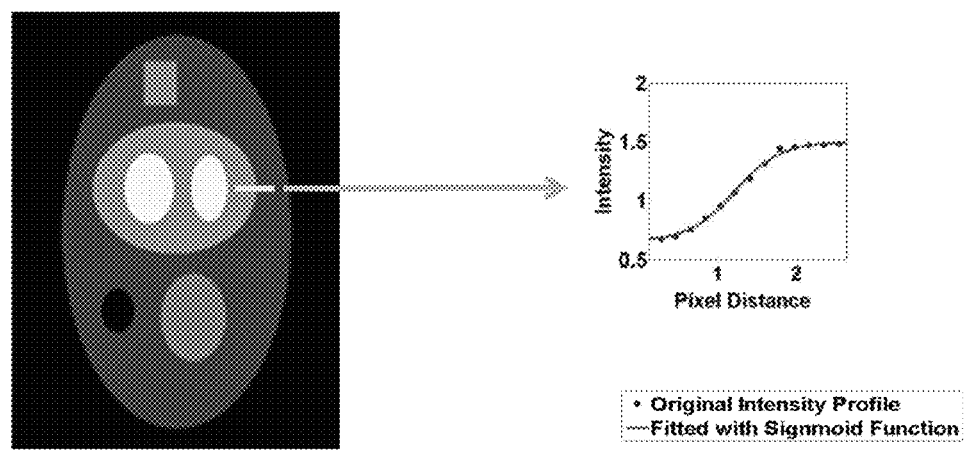
FIG. 8
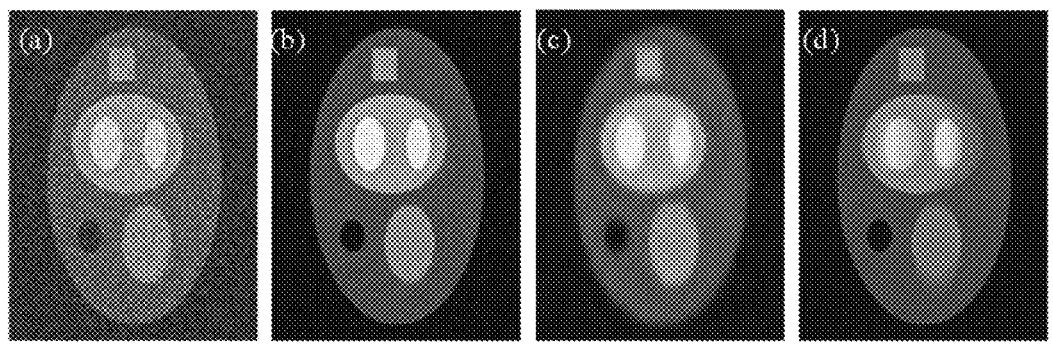
FIG. 9A  FIG. 9B  FIG. 9C  FIG. 9D

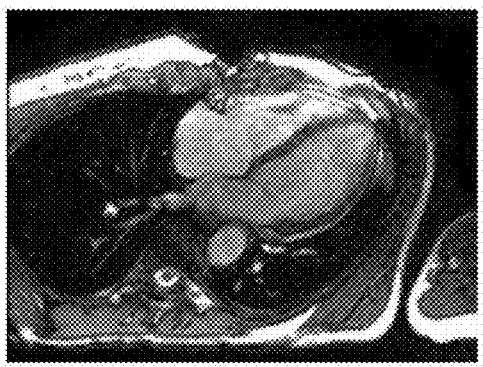 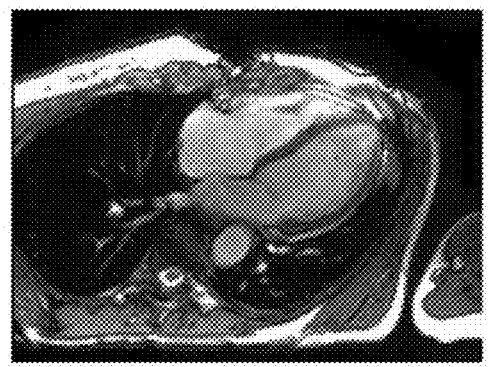
FIG. 14A  FIG. 14B
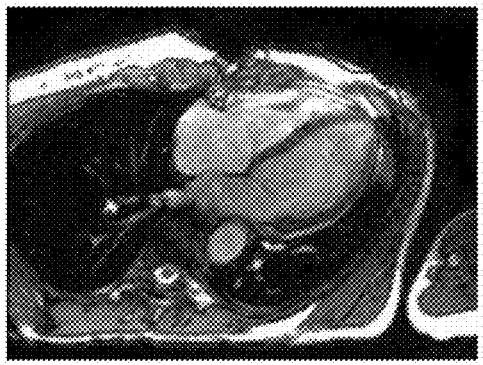 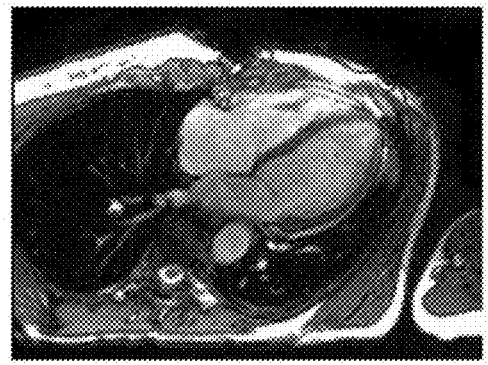
FIG. 14C  FIG. 14D

FIG. 17A FIG. 17B
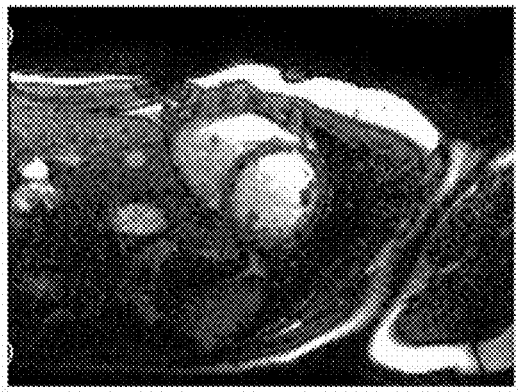 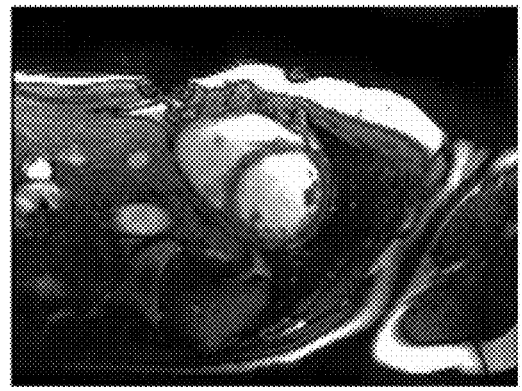
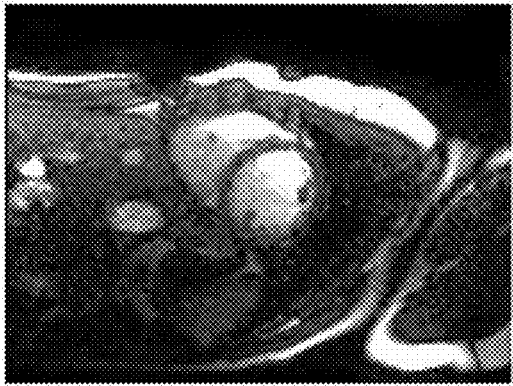 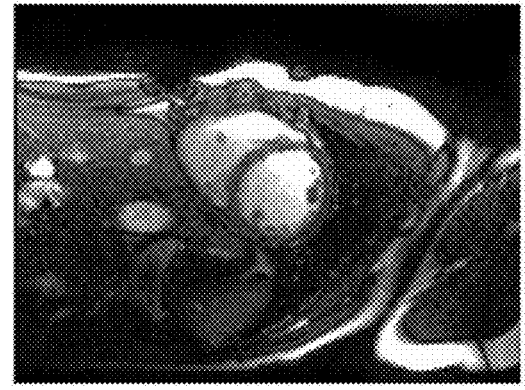
FIG. 17C FIG. 17D

FIG. 18A
FIG. 18B
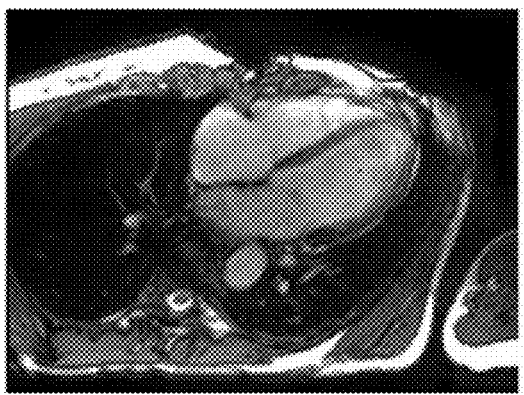
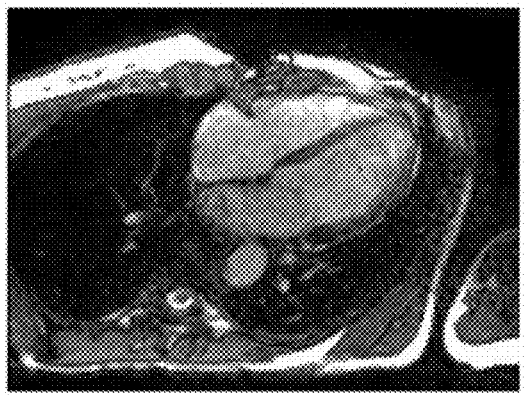
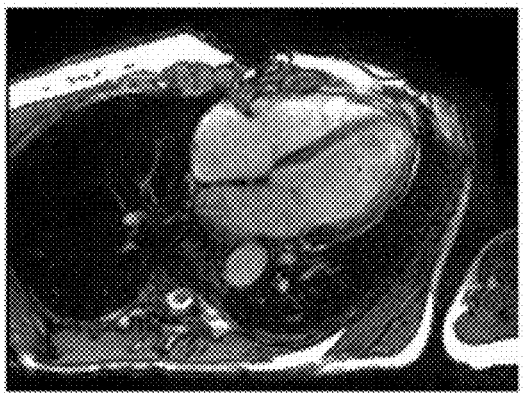
FIG. 18C
FIG. 18D

FIG. 20A
FIG. 20C
FIG. 20B
 
FIG. 20D

*FIG. 24A* *FIG. 24B*
 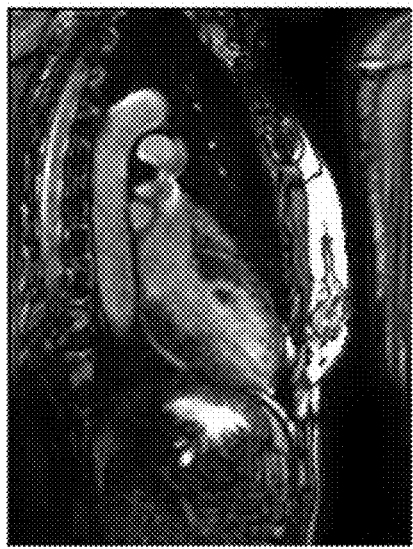
 
*FIG. 24C* *FIG. 24D*

FIG. 26A
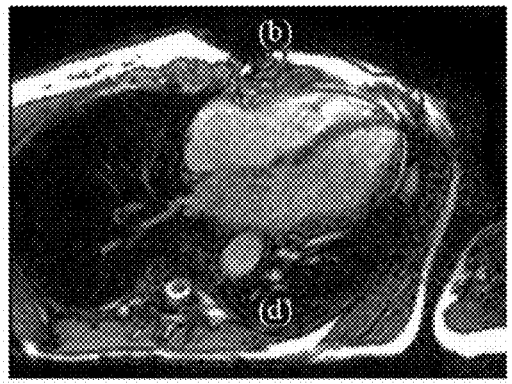
FIG. 26B  FIG. 26C
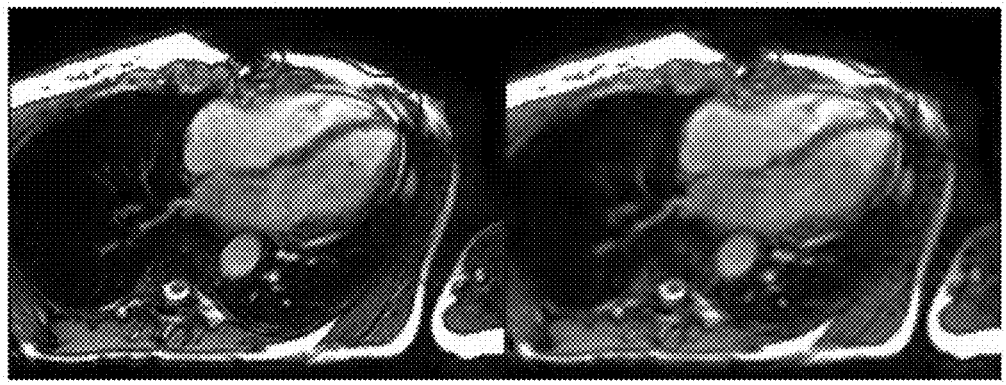
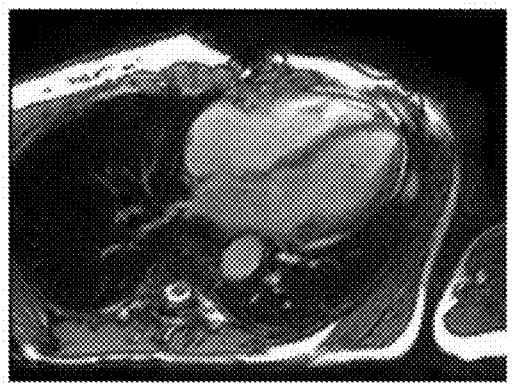
FIG. 26D

DE-NOISING OF REAL-TIME DYNAMIC MAGNETIC RESONANCE IMAGES BY THE COMBINED APPLICATION OF KARHUNEN-LOEVE TRANSFORM (KLT) AND WAVELET FILTERING

CROSS-REFERENCE TO RELATED APPLICATION

This application claims priority to U.S. Provisional Patent Application No. 61/759,119, filed Jan. 31, 2013, entitled "De-Noising of Real-Time Dynamic Magnetic Resonance Images by the Combined Application of Karhunen-Loeve Transform (KLT) And Wavelet Filtering," which is incorporated herein by reference in its entirety.

BACKGROUND

Real-time (RT) cardiac magnetic resonance (MR) cine imaging is clinically important for the diagnosis and evaluation of patients suffering from congestive heart failure, arrhythmias and other conditions. RT imaging is also beneficial in pediatric cases and under conditions where patients are unable to hold their breath. RT cardiac MR cine images are often corrupted by noise during acquisition and reconstruction. This happens because RT imaging typically sacrifices signal-to-noise ratio (SNR) to achieve sufficient temporal and spatial resolution.

Maintaining SNR is crucial in order to preserve clinically relevant information. Two factors contribute to noise in MR cine images: acquisition hardware and physiological sources. Image noise affects the quality and interpretation of clinically relevant data in varying degrees, depending on the parameters and type of image acquisition. A number of de-noising approaches have been established over the years to improve SNR of MR cine images. De-noising techniques generally fall into three broad categories: spatial filtering; temporal filtering; and a combination of spatial and temporal filtering.

Spatial filtering techniques make use of the spatial redundancies in the image. In other words, the low-spatial frequency domain contains most of the information. An example spatial filtering technique is Wavelet filtering, which is widely used for generic de-noising of images, including MR images, because it can preserve the edge better than the Fourier transform-based low-pass filter.

Temporal filtering techniques make use of the temporal redundancies in series of images acquired over time. Dynamic images of physiological process often show a high degree of temporal correlation. Since RT cardiac MR cine image series often span multiple heartbeats, they are quasi-periodic. Some frames in such image series show substantially similar features, which makes MR cine image series good candidates for temporal filtering.

Combinations of spatial and temporal filtering can be used to de-noise image series. A 3D Wavelet comprised of a 2D spatial Wavelet filter combined with a 1D temporal Wavelet filter has been proposed for video de-noising. Different spatial or temporal filters can be combined with each other depending on the characteristics of the image series. Spatial filters have been used as a means of removing noise from MR images. An example of a spatial filtering technique is Fourier-based low-pass filter. A major drawback of this method was that while removing noise, it also removes high-frequency signal components, thereby blurring the edges and fine structures in the MRI images.

Early Wavelet-based de-noising methods incorporate thresholds based on statistical models of the behavior of noise across different scales of Wavelet decomposition. These methods assume the noise is spatially white, and a single Wavelet threshold is applied. An example method proposed implements a threshold value T (a universal threshold) that is based on the standard deviation of noise and the number of samples (pixels). The main drawback with single-threshold method is there is a trade-off between signal loss and SNR gain. More aggressive threshold leads to high SNR gain and high degree of image blurring, and vice versa.

A number of Wavelet-based de-noising methods have been established to preferentially remove noise in MR images while preserving edges and details. Although methods based on scale space filtering are effective in preserving edges while removing noise, important signal details that have low amplitude might also be eliminated.

In parallel MRI, SNR reduces by at least the square root of acceleration factor and noise displays inhomogeneous spatial distribution. An edge detection algorithm may be used combined with a spatially adaptive thresholding algorithm to remove noise from images acquired using parallel MRI while preserving edge information. A specific threshold value is calculated for each pixel based on the noise map. This method makes use of soft-thresholding as well. The main disadvantage with using edge detection algorithms along with spatial filtering is that they increase complexity of the filtering process by applying separate thresholds for edge and non-edge regions. Also, output of edge detection algorithm might not always be reliable.

An alternative to edge detection algorithm is to make use of a threshold that is adaptive to the noise and signal content of the image. After Wavelet decomposition, the threshold for a specific sub-band is determined in accordance with the noise variance and the standard deviation of signal in that sub-band. Since the noise variance varies for different sub-bands, every sub-band has a unique threshold value. Temporal filters are effective in removing noise in MR images as well. One such temporal filtering method involves applying a Wavelet transform to the time-course (TC) of each pixel and performing Wavelet-domain de-noising independently on each such TC. As a consequence of WP transform, the Gaussian noise distribution is preserved in each of the sub-bands and correlated noise is effectively de-correlated across the different sub-bands of the WP decomposition.

Another temporal filtering technique is based on the Karhunen-Loeve Transform (KLT, a.k.a. Principal Component Analysis). It exploits the high temporal correlation present on real-time dynamic cardiac MR image series spanning multiple heartbeats. KLT uses this high temporal correlation to compress signal information into a finite set of eigenimages; the remaining eigenimages contain mostly noise. By using a suitable method to filter out these noise-only eigenimages, effective de-noising can be achieved. Alternatively, the KLT may be performed using singular value decomposition (SVD).

All of the filtering techniques discussed above either operate in the spatial domain or in the temporal domain. There are certain established methods that exploit redundancies in both spatial and temporal domains. Such methods use some combination of spatial and temporal filtering techniques and a selective Wavelet shrinkage method which exploits the geometry of the Wavelet sub-bands of each video frame by using a two-threshold criterion. Two criteria are typically used to determine the degree of filtering: an estimated level of noise corruption; and an amount of motion, i.e., degree of similarity between consecutive frames. However, the above method does not take advantages of the possible long-range temporal correlations in the image series, and may lead to suboptimal filtering.

SUMMARY

Systems and methods for providing a Karhunen-Love Transform Wavelet (KW) Filter that suppresses random noise in dynamic MR image series without significant loss of important information such as edge sharpness. The implementations of the present disclosure perform de-noising of dynamic image series by simultaneously taking advantage of the spatial and temporal redundancies in RT cardiac cine. The Karhunen Loeve Transform-Wavelet (KW) filtering of the present disclosure combines 1D temporal KLT with 2D spatial Wavelet filtering to achieve a significant reduction in image noise with minimal loss in image sharpness. KW filtering may be implemented as a fully automatic method that neither requires user selection of any free parameters nor acquisition of training data.

In accordance with implementations disclosed herein, a method of providing KW filtering may include applying the KLT to the dynamic image series to compress important signal information into a finite set of frames; discarding the noise-only frames using Marcenko-Pastur (MP) Law method; applying an adaptive Wavelet threshold to remaining frames; and applying an inverse KLT to obtain the de-noised image series. The KW filter may also use KLT to compress important signal information into a finite set of frames. This helps the subsequent adaptive threshold Wavelet filter to reduce noise more effectively while preserving important signal information.

In accordance with some implementations disclosed herein, there is a method of providing of suppressing random noise in an image series with M frames. The method includes applying a transform to the image series to convert a temporal series of frames into a series of eigenimages having eigenvalues; applying a probability distribution function to determine noise-only eigenimages in the series of eigenimages to determine a set of remaining eigenimages; applying a wavelet filter with an adaptive threshold to each eigenimage in the set of eigenimages to define the wavelet filter strength for each of the eigenimages in the set of eigenimages; and applying an inverse transform to obtain a de-noised image series.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIGS. 6A and 6B illustrate a digital phantom series having a phantom based on dynamic ellipsoids;

FIG. 7 illustrates a noisy phantom image showing a region of interest (ROI) for estimating signal and ROI for estimating noise;

FIG. 8 illustrates an image intensity profile that is read along the line and then fitted with a sigmoid function FIGS. 9A-9D respectively illustrate a noisy phantom image, results from KW filter, results from a Wavelet filter, and results from KLT filter;

FIGS. 14A-14D illustrate a 4 chamber view of rate 4 volunteer data respectively showing a noisy input image, a KW filtered image, a Wavelet filtered image, and a KLT filtered image;

FIGS. 17A-17D illustrate a short axis view of rate 5 volunteer data respectively showing a noisy input image, a KW filtered image, a Wavelet filtered image, and a KLT filtered image;

FIGS. 18A-18D illustrate a 4 chamber view of rate 5 volunteer data respectively showing a noisy input image, a KW filtered image, a Wavelet filtered image, and a KLT filtered image;

FIGS. 20A-20D illustrate a 2 chamber view of rate 6 volunteer data respectively showing a noisy input image, a KW filtered image, a Wavelet filtered image, and a KLT filtered image;

FIGS. 24A-24D illustrate a 2 chamber view of rate 5 volunteer data respectively showing a noisy input image, a KW filtered image, a Wavelet filtered image, and a KLT filtered image; SNR gain of all three filters were matched;

FIGS. 26A-26D illustrate a 4 chamber view of rate 5 volunteer data respectively showing a noisy input image, a KW filtered image, a Wavelet filtered image, and a KLT filtered image; SNR gain of all three filters were matched;

DETAILED DESCRIPTION

In accordance with certain implementations, de-noising RT cardiac cine images may be performed using a hybrid KW filtering technique that combines filtering in both spatial and temporal domains. The KW filter incorporates a combination of 1D KLT in the temporal domain and 2D Wavelet filtering in the spatial domain to provide higher performance than either of the individual filter components. As discussed above, filtering techniques for de-noising purposes can be applied in the spatial domain, the temporal domain or both, depending on the characteristics of the signal. Temporal filtering techniques such as Karhunen-Loeve Transform (KLT) may be applied to any image series that show a high degree of temporal correlation while spatial filtering techniques like Wavelet filtering and low pass Fourier filtering is applied to images that exhibit high spatial correlation. RT cardiac MR cine image series can exhibit high temporal correlation as well as high spatial correlation.

Figure 1:
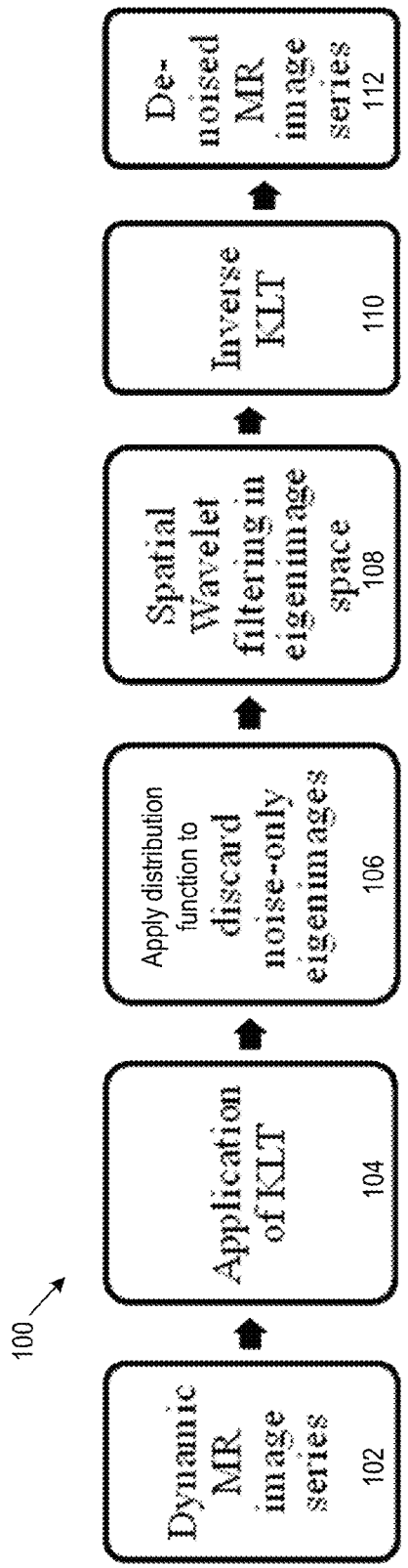
FIG. 1 illustrates an overview of the processes performed in Karhunen-Love Transform Wavelet (KW) Filtering in accordance with aspects of the present disclosure.

With reference to FIG. 1, there is illustrated an overview of the processes 100 performed by the Karhunen-Love Transform Wavelet (KW) Filter in accordance with aspects of the present disclosure. At 102, a dynamic MR image series is acquired. The MR image series may be acquired by conventional imaging techniques and stored in an image database for retrieval and filtering in accordance with the present disclosure.

Next, at 104, a Karhunen-Loeve Transform (KLT) is applied in the temporal domain to convert a temporal series of frames into a series of eigenimages where the signal is concentrated into a subset of eigenimages. As a result of the KLT, the remaining eigenimages contain mostly noise. The KLT compresses important signal information into a finite set of frames (eigenimages) and improves the subsequent Wavelet filtering because the threshold value used to filter noise in each frame is adaptive to signal content as well as noise content in that frame.

In general, KLT is a linear transformation that decorrelates the data in such a way that most of the signal energy is concentrated into a few eigenimages. It is a well-known signal processing technique for image compression and filtering and is used herein to exploit the high temporal correlation present in quasi-periodic dynamic MR images. Consider M frames of a noisy dynamic MR image series. If each image frame consists of N pixels, then the entire image series can be represented by an M×N matrix I, where each row corresponds to a noisy image frame. The M×M empirical temporal covariance matrix $R=II^T/N$ has M eigenvalues ($\lambda_1 \le \lambda_2 \le \ldots \le \lambda_M$) and a corresponding eigenvector matrix E, with eigenvectors as rows. Applying E to I yields an eigenimage matrix X $$X = EI \quad (1)$$

In the matrix X, the eigenimages represented by rows are sorted by their eigenvalues in ascending order. This means that the eigenimages are sorted by information content; the first several eigenimages contain small eigenvalues (i.e., less signal information or mostly noise) and most of the signal information is stored in the last few eigenimages.

Figure 2:
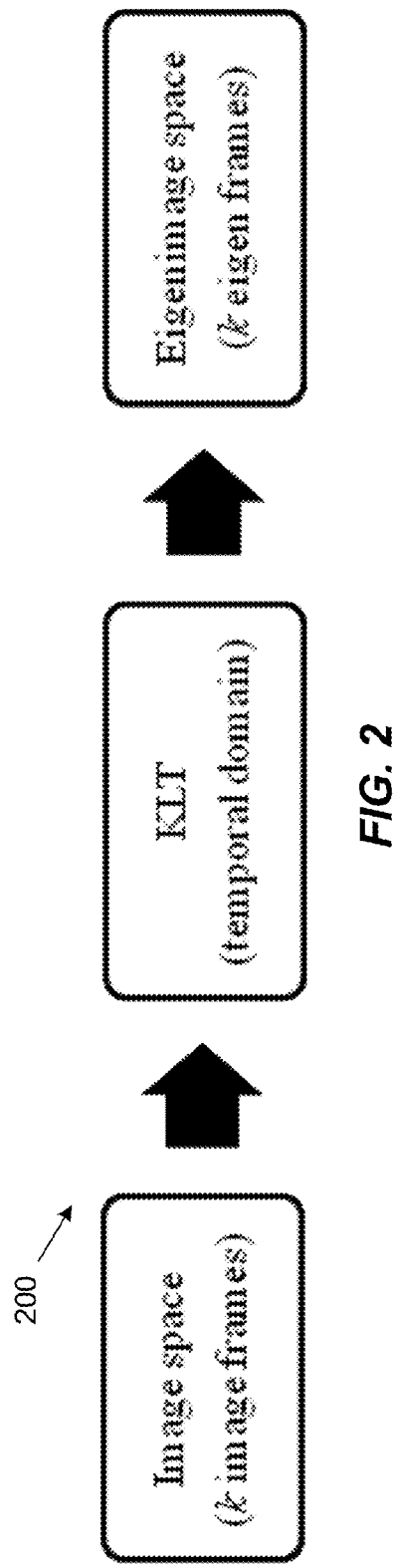
FIG. 2 illustrates the processes of the Karhunen-Loeve Transform (KLT)

Referring now to FIG. 2, there is a block diagram 200 illustrating the function of the KLT. As illustrated, the KLT converts information from an image space into an eigenimage space. In the original images, information content is approximately equal in all temporal frames. By generating the series of eigenimages, the information content is concentrated into fewer frames (e.g., the last few). The KLT may be applied in accordance with the disclosure of U.S. Pat. No. 8,208,709, to Ding et al., which is incorporated herein by reference in its entirety. Subsequent Wavelet filtering (described below at 108) uses a thresholding technique that is adaptive to noise and signal information of each frame, a stronger level of filtering will be automatically applied to the eigenimages containing mostly noise. This leads to improved noise reduction as well as better signal preservation. Therefore, the temporal KLT can be used to enhance the effectiveness of subsequent Wavelet filtering.

Referring again to FIG. 1, at 106, a distribution function is applied to the noise-only eigenimages, which are then discarded. For example, the Marcenko-Pastur (MP) Law method is used define the noise-only eigenimages. A consideration for the filtering method of the present disclosure (e.g., the KLT filter), is to define an appropriate cutoff or threshold that results in noise suppression without sacrificing signal. In the case of the KLT, it is a goal to remove the noise-only eigenimages while preserving the eigenimages that contain useful signal. Thus, in accordance with implementations herein, the MP Law may be used to select the noise-only eigenimages. This is based on the principle that the eigenvalues associated with noise-only eigenimages follow the MP distribution, whereas the noise-only eigenimages can be identified using a hypothesis-test method employing the goodness-of-fit. Other functions that can be applied to identify noise-only eigenimages based on a distribution of noise may be used at 106.

The MP-law states that the eigenvalues of the noise-only eigenimages follow a specific probability distribution function:

$$p(\lambda) = \frac{1}{2\pi\sigma^2 \lambda a} \sqrt{\max(0, (\lambda max - \lambda)(\lambda - \lambda min)} \quad (2)$$

$$\lambda max, min = \sigma^2 (1 \pm \sqrt{\alpha})^2 \quad (3)$$

where $\sigma^2$ is the noise variance, $\lambda max$ is the maximum eigenvalue of the noise-only eigenimages, $\lambda min$ is the minimum eigenvalue of the noise-only eigenimages and $\alpha=(M-r)/N$ where M is the total number of images, r is the cutoff, i.e. M−r is the number of noise only eigenimages, N is the pixel number per image.

The following are examples steps for estimating the noise variance in a series of dynamic images using the MP Law:

i. For the input RT cardiac MR cine image series, compute the eigenimages and corresponding eigenvalues using KLT ii. Assuming the total number of frames in the input image series is M, select one eigenimage cutoff r and calculate $\sigma^2$ (noise variance) as the average of first M−r eigenimages using the relationship shown below:

$$\sigma^2 = \int_{\lambda min}^{\lambda max} \lambda p(\lambda) d\lambda \quad (4)$$

iii. Vary the pixel number N (pixels in each frame) to maximize the goodness-of-fit (GOF) between the MP-distribution and the first M−r eigenvalues using the Kolmogorov-Smirnov (KS) Test. The KS-test uses the maximum difference between the cumulative distribution function of the target PDF and the empiric cumulative distribution function of samples as the measure of GOF.

iv. Repeat steps 2 (varying r) and 3 (varying N) using a double resolution coarse-fine searching algorithm until the global maximum of GOF is found at eigenimage cutoff $r=r_0$ and pixel number $N=N_0$.

v. The first $M-r_0$ eigenimages are noise-only eigenimages. For each pixel, the noise variance is evaluated from the intensity fluctuation across these noise-only eigenimages.

After the noise-only eigenimages are identified using MP Law, they are discarded (e.g., zero-filled) so that only the eigenimages with signal information remains. This approach has been validated in MR dynamic images with parallel reconstruction.

Next, at 108, the preserved eigenimages are subjected to spatial Wavelet filtering. In accordance with some implementations of the present disclosure, the Wavelet filtering is implemented using a soft thresholding method where the Wavelet threshold is directly proportional to noise variance and inversely proportional to signal standard deviation of each eigenimage. A Wavelet threshold that is adaptive to signal content is to apply stronger filtering to eigenimages with low signal information and weaker filtering to eigenimages with significantly high signal information. Such an adaptive Wavelet threshold improves noise reduction while preserving significant signal information.

In accordance with some implementations of the present disclosure, the Wavelet filtering method uses an adaptive Wavelet threshold, as proposed by Chang et al in *Adaptive Wavelet Thresholding for Image Denoising and Compression*, IEEE Trans. Image Processing, Vol. 9, No. 9: 1532-1546 (2000), the disclosure of which is incorporated by reference in its entirety. The determination of the adaptive Wavelet threshold may be a fully automatic method. The adaptive Wavelet threshold may be computed as the ratio of noise variance to signal standard deviation in a particular image, and it is optimal in the Bayesian sense. Such a threshold is then applied to each eigenimage that remains after noise-only eigenimages are discarded using MP Law. By performing the Wavelet filtering method at 108, additional suppression of noise beyond that which is provided by the KLT filter alone is provided. Since KLT acts to push important signal information into few eigenimages, this improves the effectiveness of the adaptive Wavelet filter which assigns a higher Wavelet threshold for eigenimages with more noise (or less signal information) and lower threshold for eigenimages with less noise (or more signal information).

Spatial Wavelet filtering may consist of applying a Wavelet transformation followed by an adaptive threshold calculation, and then followed by an inverse Wavelet transformation. Each will be described in further detail below. The first step of applying a Wavelet transform may be performed as a 3-level non-decimated Wavelet transform that is applied to each remaining eigenimage after noise-only eigenimages are discarded using MP Law at 106. A non-decimated Wavelet algorithm may be used as it produces better de-noising results than a decimated Wavelet algorithm. For example, applying a non-decimated algorithm rather than a decimated algorithm for de-noising applications improves the result by more than 170% (2.5 dB). The non-decimated algorithm saves the detail coefficients in each level and uses the low-frequency coefficients for the next level. This way the size of the Wavelet coefficients does not diminish from one level to the next. By using all coefficients in one level, high frequency information is well defined across all levels.

Figure 3:
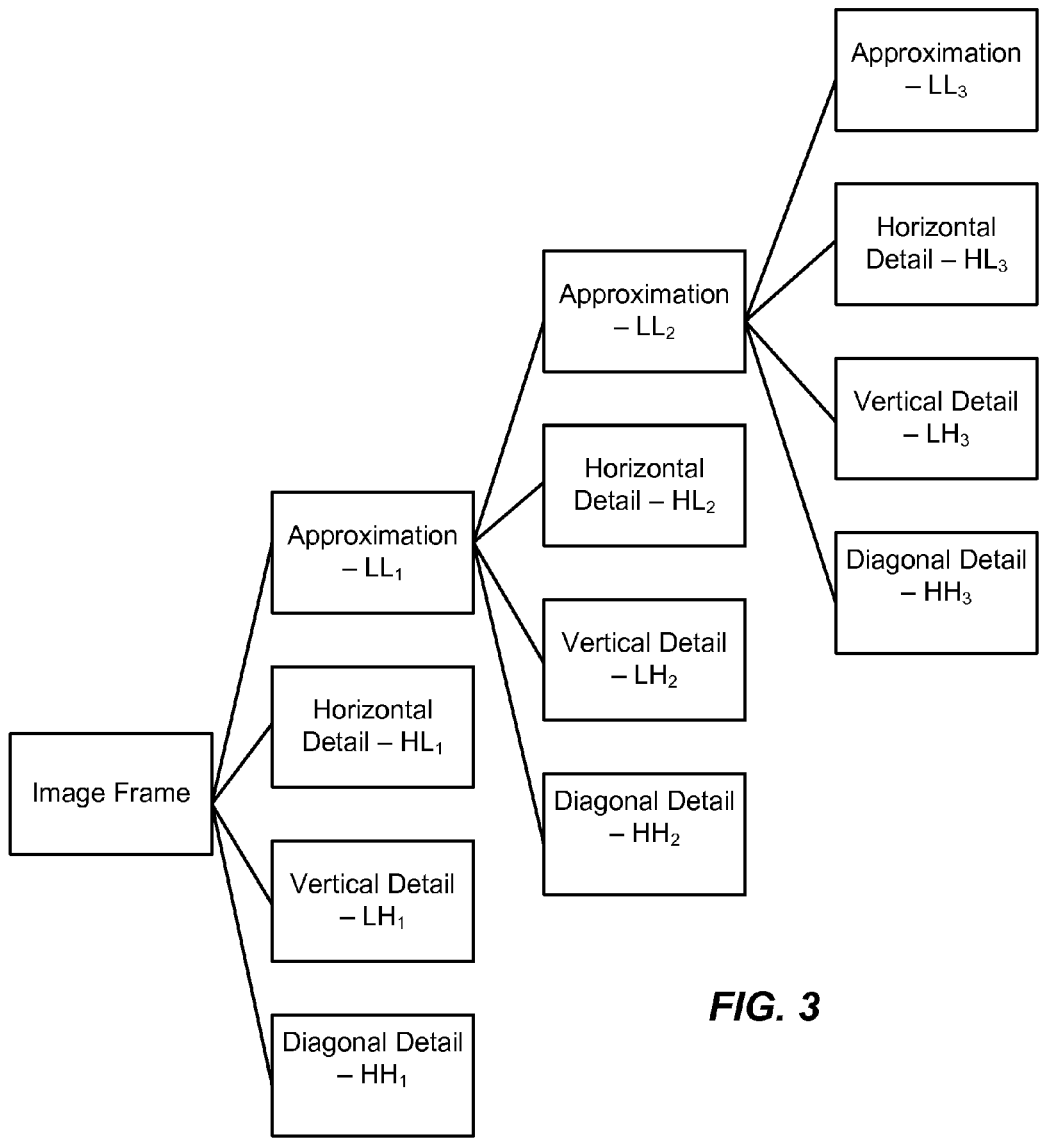
FIG. 3 illustrates sub-bands of redundant 2D wavelet transform.

Applying a 2-D Wavelet transform divides an image into one low frequency component called "approximation" and three high frequency components (vertical, horizontal and diagonal) called "details." FIG. 3 illustrates sub-bands obtained for a redundant Wavelet transform with three scales of decomposition. As shown in FIG. 3, the "approximation" contains most of the important signal information and the "details" contain high frequency information as well as noise. Therefore, the Wavelet thresholding procedure removes noise by thresholding only the Wavelet coefficients of the detail sub-bands, while keeping the low resolution approximation coefficients unaltered.

The next step of applying an adaptive threshold calculation may be performed in accordance with the thresholding method of Chang, which is optimal in Bayesian analysis with Gaussian prior. Noise is mostly concentrated in the high-frequency detail coefficients, thus the Wavelet threshold is calculated and applied for each detail coefficient in each of the 3 levels. It is described by the relationship:

$$T(\sigma_X) = \frac{\sigma^2}{\sigma_X} \quad (5)$$

where $\sigma^2$ is the noise variance calculated and averaged over all the noise-only eigenimages determined by MP Law. This value of noise variance is held constant while computing the Wavelet threshold value for all detail coefficients. The signal standard deviation $\sigma_X$ of each sub-band is computed using the following relationship:

$$\sigma_X = \sqrt{\max(\sigma_Y^2 - \sigma^2, 0)} \quad (6)$$

where $\sigma_Y^2$ is the variance of pixel values in a sub-band that include both signal information and noise.

After finding the standard deviation of the signal $\sigma_X$ in each detail sub-band, the data-driven, sub-band-dependent soft-threshold T can be calculated using Eq. 5. This threshold T is calculated and applied for sub-bands of eigenimages. As the threshold is calculated for each of the three details (horizontal, vertical and diagonal), three thresholds are obtained for each scale of decomposition for each eigenimage.

The next step of applying an inverse Wavelet transform involves subjecting the eigenimages to the inverse Wavelet transform. This is represented in Eq. 7 below.

$$D=W^{-1}T \quad (7)$$

where $D=\{d_{ij}\}_{i,j}$ represents the matrix of de-noised eigenimages, $W^{-1}$ represents the 2D dyadic inverse Wavelet transform operator and $T=\{t_{ij}\}_{i,j}$ represents the matrix of Wavelet coefficients after application of Wavelet threshold.

Referring again to FIG. 1, at 110, an inverse KLT is applied to revert back to image space from eigenimage space, which is the final step in the implementation of KW filter. The inverse KLT is used to transform back to image space from eigenimage space. At 112, the output image series obtained after inverse KLT will be the de-noised image series. The final de-noised output image series is represented by the matrix $F=\{f_{ij}\}_{i,j}$ and is shown below in Eq. 8:

$$F=E^{-1}D \quad (8)$$

where $E^1$ represents the inverse KLT operator.

Figure 4A:
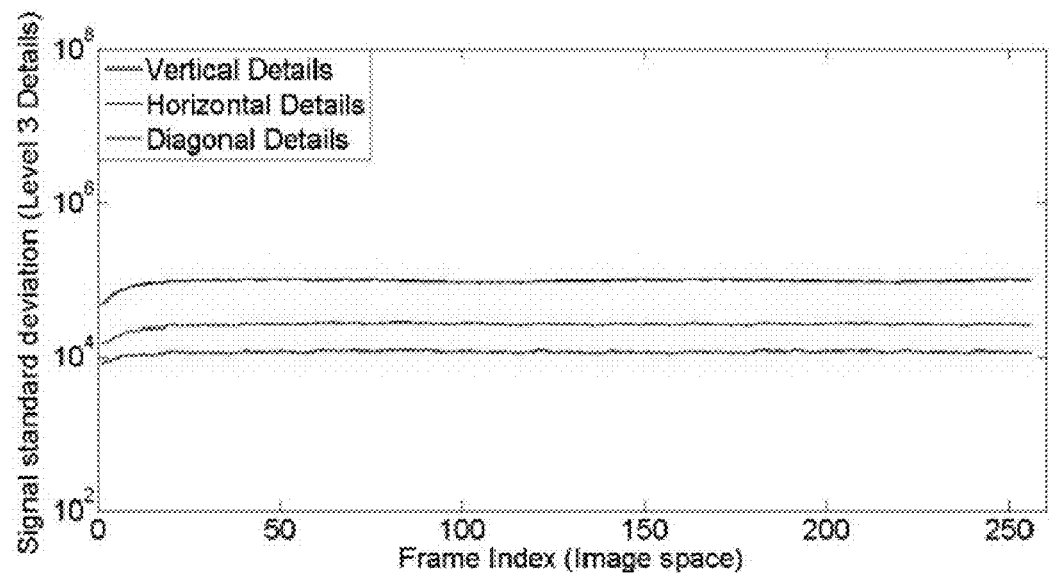
FIGS. 4A and 4B illustrate the standard deviation of the signal without KLT and with KLT.
Figure 4B:
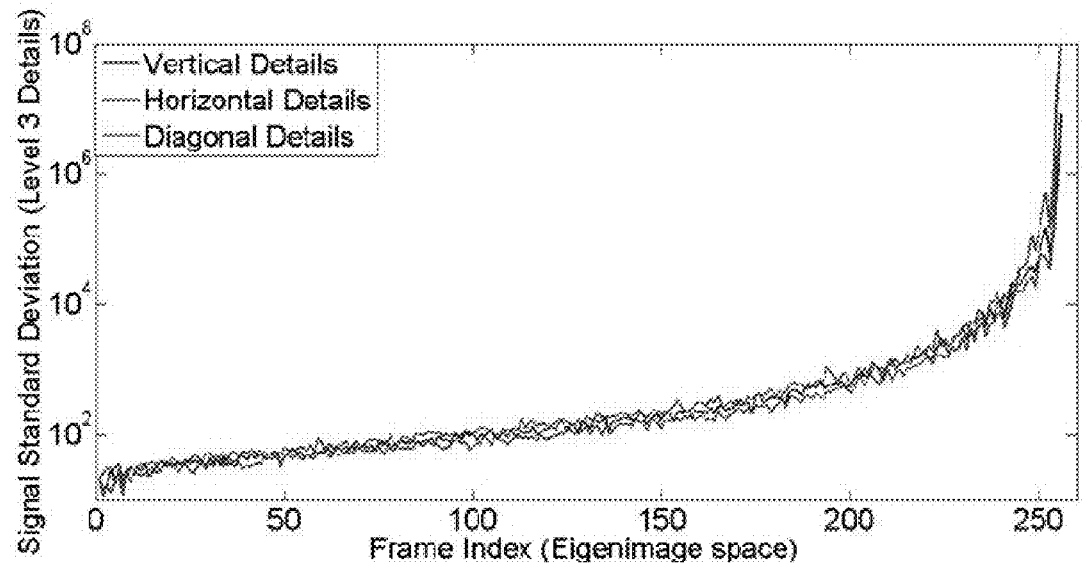

As described above, the KLT acts to concentrate important signal energy into a finite number of eigenimages. Since the Wavelet threshold for subsequent filtering is calculated as the ratio of noise variance to the signal standard deviation, this results in stronger filtering of eigenimages that contain significant noise. With reference to FIGS. 4A and 4B, to observe the effect of KLT in subsequent Wavelet filtering, the short axis image series of a rate 5 volunteer data may be considered, which contains a total of 256 frames. After three levels of Wavelet decomposition, the signal information stored in the three details (horizontal, vertical and diagonal) of each image frame is analyzed with and without the application of KLT.

FIG. 4A shows the standard deviation of the signal stored in the details across all 256 frames of a standard cine image series in level 3 of Wavelet decomposition. For the application of Wavelet filtering alone without KLT, the filtering process is done in image space rather than eigenimage space. From FIG. 4A, it can be seen that the signal information stored in the details appears to be constant across all 256 frames in image space. As mentioned earlier, KLT converts an input image series into a set of eigenimages. These eigenimages are sorted in ascending order of corresponding eigenvalues, i.e., ascending order of information content. This means that the first few eigenimages show very low signal information and therefore, they contain mostly noise; most of the signal information is stored in the last few eigenimages. FIG. 4B shows how KLT acts to push the important signal information to the last few eigenimages.

Figure 5A:
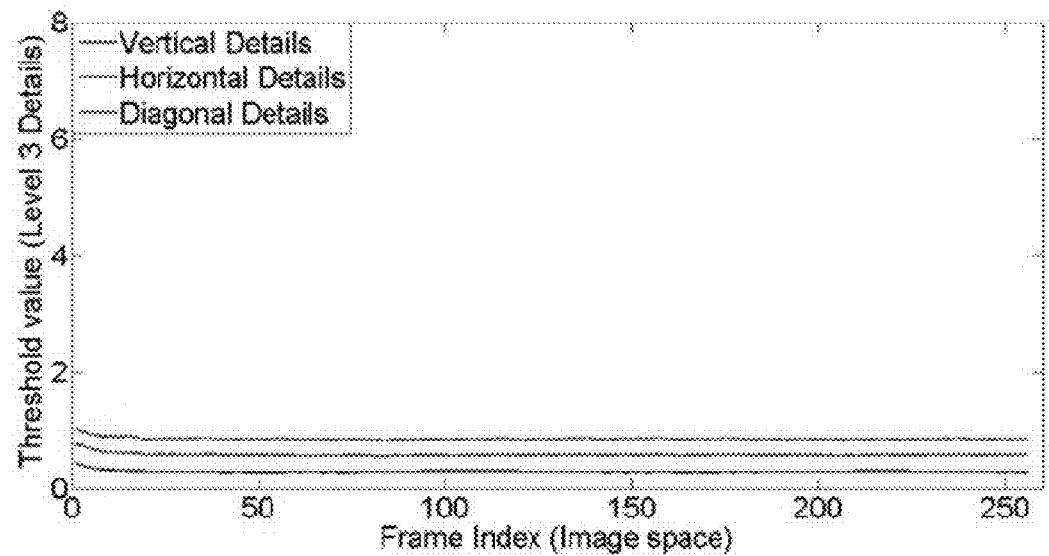
FIGS. 5A and 5B illustrate wavelet filter thresholds for the three "details" derived from series of standard cine images and eigenimages derived using KLT.
Figure 5B:
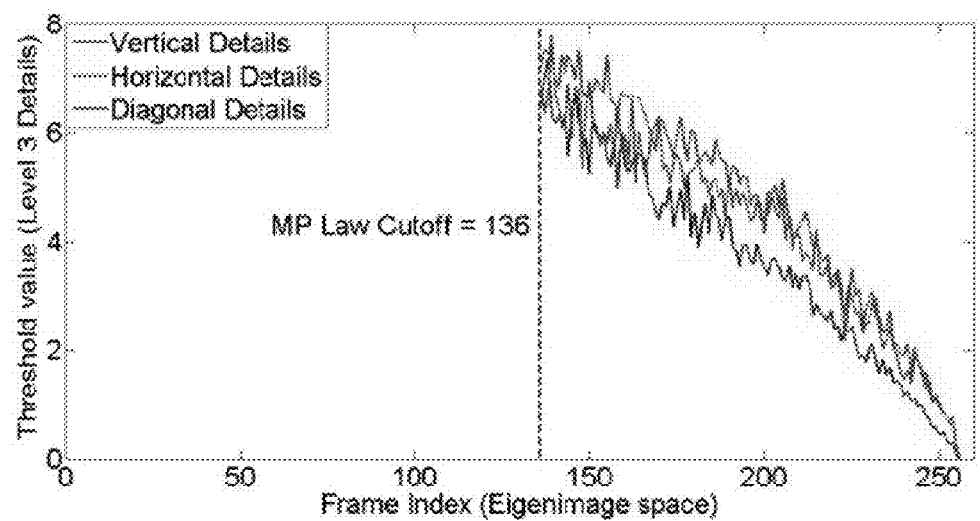

With reference to FIGS. 5A and 5B, there is shown Wavelet filter thresholds for the three "details" (at decomposition level no. 3) derived from series of standard cine images (FIG. 5A) and eigenimages derived using KLT (FIG. 5B). The variation in threshold seen in FIG. 5B reveals that a stronger level of Wavelet filtering will be automatically applied to the eigenimages containing mostly noise. FIG. 5A shows the Wavelet threshold computed for the details across all 256 frames of a standard cine image series in level 3 of Wavelet decomposition. From FIG. 4A, since the signal standard deviation of the details appears to be uniformly spread across all 256 frames in image space (without KLT), the Wavelet threshold also appears to be uniformly spread across all frames because Wavelet threshold is computed as the ratio of noise variance to signal standard deviation.

From FIG. 5B, it is evident that the threshold value for the details in eigenimage space gradually decreases with increasing frame index because KLT acts to concentrate signal information into the last few eigenimages. Since Wavelet threshold is inversely proportional to the signal standard deviation, this gradual decrease is visible starting from the MP Law cutoff. The cutoff determined by MP Law method is labeled in FIG. 5B. Eigenimages below the MP Law cutoff are zero-filled to eliminate the contribution of noise into the filtered image series.

Thus, a KW filter is described above that is superior to spatial Wavelet filtering, as the KW filter exploits temporal correlations via KLT. Preceding the spatial Wavelet filter by KLT concentrates signal into a subset of frames, allowing stronger spatial Wavelet filtering of those frames containing primarily noise. The KW filter approach is also compared with temporal KLT filtering. Temporal KLT filter functions by first applying a KLT and then discarding the noise-only frames as determined by MP-Law cutoff, leaving the remaining frames untouched. Applying adaptive Wavelet filtering to the remaining frames improves on KLT filtering by removing noise from these frames, while preserving important signal information. For these reasons, the KW filter offers superior noise reduction performance to either spatial Wavelet or temporal KLT filtering alone.

Alternatively or additionally to the above, the KW filter can be applied to any data set that can be represented as a 3-D array. The KLT can be applied in one dimension, and the 2-D Wavelet filter can be applied in the eigenimage domain. In addition, the KLT can be applied in any data set that can be represented as 2-D array. The KLT can be applied in the first dimension, and the 1-D Wavelet filter can be applied in the eigenvector domain (the second dimension).

Example Results—Phantom Images

For analysis purposes, a dynamic series of phantom images was generated that regionally changes shape over time. The generated series of phantom images were of size 120×160 having a total of 120 temporal frames with a periodicity of 20 frames. Noise of standard deviation 0.08 was added to these images and the performance of the KW filter approach above was investigated. Using a SNR measurement method described below, the SNR of the noise-added phantom image was found to be 8.27. Two selected frames from the dynamic phantom are shown in FIGS. 6A and 6B, which illustrate digital phantom series with 160×120 spatial size and 120 temporal frames in total. The phantom is based on dynamic ellipsoids. Two selected frames showing the motion of the phantom data.

To evaluate filtering performance of KW filter on phantom images, SNR gain, image sharpness and RMS difference were used as performance indices. Filtering performance of KW filter was compared to that of Wavelet filter and KLT filter in terms of edge sharpness and RMS difference for a matched value of SNR gain. Tools to compute SNR gain, sharpness and RMS difference are described below.

To estimate noise (SNR) in phantom images, a method may be used as proposed by Donoho and Johnstone, *Ideal spatial adaptation via Wavelet shrinkage, Biometrika* 81: 425-55 (1994), the contents of which are incorporated by reference in its entirety. The method includes a single-level 1D Haar Wavelet transform may be applied to the time-course (TC) of each pixel. TC denotes a 1D array that holds the value of a single pixel across time. Applying Wavelet transform to TC of each pixel provides approximation and detail coefficients for that pixel. Eq. 13 shown below is applied to detail coefficients of each pixel to obtain standard deviation of noise for that pixel:

$$\sigma(k) = \frac{\text{median}(|D(k)|)}{0.6745} \quad (9)$$

where D(k) denotes detail coefficients and σ(k) denotes standard deviation of noise for pixel k. Computing σ for each pixel provides a noise map for the phantom image, as shown in FIG. 7, which illustrates a noisy phantom image showing (i) ROI for estimating signal (dashed) and (ii) ROI for estimating noise (dotted).

To estimate signal, a mask was applied on the phantom image (dashed lines in FIG. 7) to select a region where signal appears constant across time, i.e., a region where there is no temporal variation. Mean value of this constant region gives mean value of signal for the phantom image. The reason for selecting a constant region is to eliminate interference of noise caused due to temporal variation. To estimate noise, Donoho's method was first used to generate a noise map for the image. Then, a mask was applied on the noise map (dotted line in FIG. 7) to consider only the signal part of the phantom while ignoring the background. The mean value of this selective part of the noise map gives standard deviation of noise for the phantom image. The ratio of mean signal value to noise standard deviation gives the SNR value for the phantom image.

To measure image sharpness, a method based on parametric modeling of image edges may be used. To describe edges, a sigmoid function $f$ may be used, which is defined as:

$$f(r; a_0, a_1, a_2, a_3) = \frac{a_1}{1 + 10^{a_3(a_0-r)}} + a_2 \qquad (10)$$

where $a_0$, $a_1$, and $a_2$ describe center location, amplitude, and offset of the sigmoid function, respectively, r represents distance in terms of pixels, and $a_3$ defines growth rate or sharpness of the sigmoid function.

The image sharpness measurement process used here consists of the following five example steps: (i) apply edge detection algorithm to automatically identify the dominant edges (ii) manually select edge pixels via a graphical user interface; (iii) read image intensity profiles across all selected edge pixels; (iv) individually curve fit the intensity profiles with the sigmoid function (Eq. (10)) to estimate values of r for each edge pixel; and (v) use the mean of the estimated values of r as a measure of image sharpness. FIG. 8 provides an illustration of the process, which illustrates an image intensity profile that is read along the yellow line (left) and then fitted with a sigmoid function (right). The above procedure is repeated for multiple frames to cover one complete motion cycle. A final edge sharpness value is obtained by averaging the measurements over the whole cycle.

Root-mean-squared error (RMS error) is a parameter used to analyze the degree of deviation of the filtered image from the original noise-free image. It is computed using the following example steps: subtracting filtered image from original noise-free image; squaring all pixels in the difference image; finding the mean value of the squared pixels; and applying root to this mean value to obtain RMS difference value. RMS difference provides an estimation of how close the filtered image is to the original noise-free image.

For phantom data, the performance of KW filter was compared with two other filters—a Wavelet filter and a KLT filter in terms of edge sharpness and RMS error after SNR gain of all three filters were matched. The sections below discuss a Wavelet filter, a KLT filter and the method used to match the SNR gains of all three filters.

For the Wavelet filter, the filtering was performed using the adaptive Wavelet threshold method similar to the one used for KW filtering. The difference is that spatial Wavelet filtering is applied without the application of KLT, i.e., Wavelet filtering is done in image space rather than eigenimage space. Wavelet filter can be applied using the following example steps: applying three-level non-decimated Wavelet transform to obtain approximation and detail coefficients; applying adaptive Wavelet threshold shown in Eq. 5 to filter detail coefficients in each of the three levels; and applying inverse Wavelet transform to get de-noise image series.

The SNR of 2D spatial Wavelet filter was matched with that of KW filter by simply varying the Wavelet threshold using a scale factor as shown by the equation below:

$$T(\sigma_X) = \frac{\sigma^2}{\sigma_X} \beta \qquad (11)$$

where $\beta$ is the scale factor used to match the SNR of Wavelet filter to KW filter. $\beta$ was increased linearly in steps of 0.5 until the desired SNR gain was achieved, i.e., the SNR gain provided by the Wavelet filter matched that of the KW filter. Increasing $\beta$ is expected to lead to loss of information content, and this was investigated by measuring edge sharpness and RMS error in the Wavelet filtered images.

Figure 10:
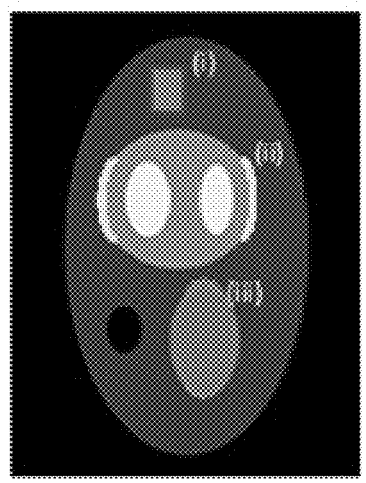
FIG. 10 illustrates different edges.

The KLT filter was implemented by applying KLT in the temporal domain and then discarding the noise-only eigenimages estimated by MP-Law method. Finally, the inverse KLT was applied to obtain the de-noised images. FIG. 10 shows the steps needed to de-noise images using KLT filter. To match SNR of KLT filter with that of KW filter, more eigenimages need to be discarded in addition to the ones already discarded using MP Law cutoff. KLT filter satisfies the following equation:

$$\frac{\sigma_{filtered}}{\sigma_{original}} = \sqrt{m/p} \qquad (12)$$

where m is the number of eigenimages that pass through the filter and p denotes the total number of eigenimages. Equation 12 demonstrates that the ratio of noise standard deviation after filtering to noise standard deviation before filtering is equal to $\sqrt{m/p}$. Therefore, discarding more eigenimages (i.e., decreasing m) leads to increase in SNR gain. In this manner, the SNR gain of the KLT filter was matched to that of the KW filter. Discarding additional eigenimages beyond the MP Law cutoff is expected to lead to loss of information, especially blurring of moving edges, and this was investigated by measuring edge sharpness and RMS error in the KLT filtered images.

To compare and evaluate the effect of three filters—KW filter, Wavelet filter and KLT filter—on phantom data, the following example steps may be implemented:
1. KW filter was applied on noisy phantom image series and SNR gain was computed;
2. SNR gain of Wavelet filter was empirically matched to that of KW filter by increasing the adaptive Wavelet threshold;
3. SNR gain of KLT filter was empirically matched to that of KW filter by further discarding eigenimages in addition to the ones that were already discarded using MP Law cutoff;
4. After SNR gains of all three filters were matched, edge sharpness of filtered image obtained using each filtering technique was measured; and
5. Also, RMS difference of filtered image from original noise-free image was calculated for all three filters.

To compute edge sharpness, three edges in the phantom image are considered—the stationary edge, the horizontal moving edge and the vertical moving edge. For each edge, sharpness was calculated and averaged over a set of frames that cover one complete motion cycle (e.g., 20 frames). All the filters—KW filter, Wavelet filter, and KLT filter—were applied on the dynamic phantom. For the noisy phantom image series, calculated SNR was found to be 8.27. After application of KW filtering, SNR of the filtered image was observed to be 72.99. The SNR of all three filters were matched which gives us a common base to compare the sharpness of the three filters. A representative frame from the original and each of the filtered image series is shown in FIGS. 9A-9D, which illustrates a Noisy phantom image (FIG. 9A), and results from KW filter (FIG. 9B), Wavelet filter (FIG. 9C), and KLT filter (FIG. 9D). From FIGS. 9A-9D, it is illustrated that for a given level of noise reduction, KW filtering shows better performance compared to both Wavelet filtering and KLT filtering in terms of edge sharpness.

Figure 11:
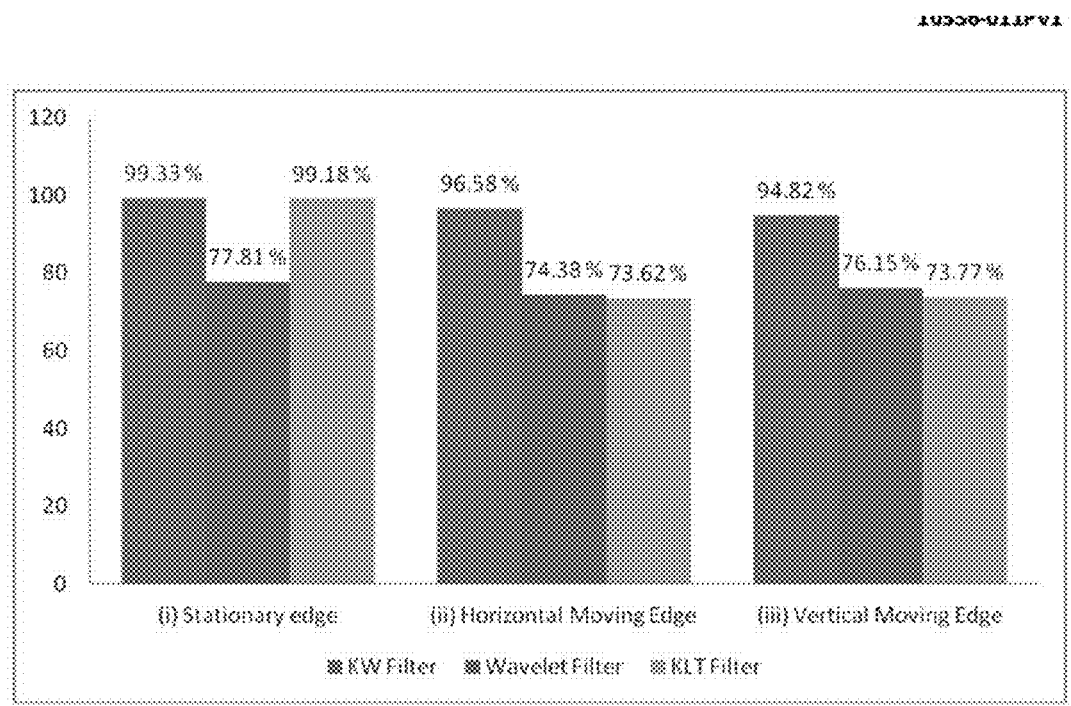
FIG. 11 illustrates an edge sharpness measurement for each filter shown as percentage of sharpness of original noise-free image.

To evaluate the ability of the KW filter to preserve edges, the edge sharpness may be evaluated at different regions of the phantom image. The three edges, shown in FIG. 10, that were selected for measurement are: (i) Stationary edge, (ii) horizontal moving edge, and (iii) vertical moving edge. The sharpness was calculated using the algorithm described above. The image intensity along a normal perpendicular to the edge was computed and then least-square fitted with a sigmoid function. Edge sharpness for each filter was calculated and presented as percentage of edge sharpness of the original noise-free phantom image (gold standard). The sharpness measurements are shown in FIG. 11, which illustrates three edge sharpness measurement for each filter shown as percentage of sharpness of original noise-free image Analyzing the stationary edge results in FIG. 11, KLT and KW filters show a sharpness loss of less than 1% while Wavelet filter causes a sharpness loss of nearly 22%. This is due to the fact that both KLT and KW filter exploit the temporal redundancies in the image through the application of KLT. Therefore, if a particular region in the image shows minimal or no change across consecutive frames, then KLT is more effective in compressing important signal information. On the other hand, Wavelet filter is a spatial filter. Therefore, it exploits only spatial redundancies and the blurring of edges is independent of whether or not the edge is moving.

Sharpness results for moving edges follow a different pattern when compared to stationary edge results. For the horizontal moving edge, loss in edge sharpness caused by KW, Wavelet and KLT filters were 3.4%, 25.6% and 26.4% respectively. Sharpness results for the vertical moving edge were similar to that of horizontal moving edge with KW, Wavelet and KLT filters showing a loss of 5.2%, 23.8% and 26.2% respectively. This was expected since none of the three filtering methods should show any directional dependence. Significant temporal variation adversely affects temporal filters that rely on temporal redundancies across image frames. This explains why temporal filters like KLT filter show better sharpness results on stationary edges than on moving edges.

Comparison of KW and KLT Filter:

Both KLT and KW filters make use of the MP Law cutoff to identify and discard noise-only eigenimages. After this step, KW filter applies Wavelet filtering in the spatial domain to further increase SNR gain. To match this additional SNR gain provided by KW filter, additional eigenimages were discarded (zero-filled) by the KLT filter beyond the MP Law cutoff causing a loss in temporal information. The KW filter instead applied a spatial Wavelet filter to the remaining eigenimages, thereby keeping the important signal information while reducing the noise. This is the reason KW filter showed better sharpness results compared to the KLT filter for moving edges.

Comparison of KW and Wavelet Filter:

Both KW and Wavelet filters make use of 2D Wavelet filtering for spatial de-noising. However, KW filter first uses KLT to compress important signal information into a finite set of eigenimages. This improves the working of the subsequent Wavelet filtering that makes use of an adaptive threshold, thereby providing an additional SNR gain over Wavelet filter. To account for this additional SNR gain, the Wavelet threshold used in Wavelet filter was increased to match the SNR of the KW filter. Increasing the Wavelet threshold causes spatial information loss and is likely to cause blurring of edges. This was corroborated by the edge sharpness measurements which showed that sharpness loss caused by Wavelet filter was uniform, irrespective of edge motion. The KW filter demonstrated superior edge preservation (stationary and moving) compared to the Wavelet filter for the same gain in SNR.

To evaluate the significance of difference in sharpness between the filtered images and original noise-free image, paired t-test was performed on the sharpness measurements of the following pairs
1. Original noise-free image and KW filtered image
2. Original noise-free image and Wavelet filtered image
3. Original noise-free image and KLT filtered image
4. KW filtered image and KLT filtered image
5. KW filtered image and Wavelet filtered image
   with the assumption that both samples have unequal mean with unknown and unequal variance and alpha (significance level) is 0.05.

TABLE 1

|  | ORIGINAL NOISE-FREE IMAGE | KW FILTER |
| --- | --- | --- |
| KW FILTER | $P > 0.05$ | — |
| WAVELET FILTER | $P < 0.001$ | $P < 0.001$ |
| KLT FILTER | $P > 0.05$ | $P > 0.05$ |

Table 1 illustrates p-value of paired t-test between sharpness measurements in stationary edge of original and filtered images. The p-values in Table 1 show that the stationary edge sharpness of the original noise-free image, KW filtered image and KLT filtered image were not significantly different from one another since corresponding p-values are greater than 0.05. However, the stationary edge sharpness of the Wavelet filtered image was significantly different from similar measurements in both original noise-free image and KW filtered image. Thus, Table 1 shows that KW filter and KLT filter preserve stationary edge sharpness while Wavelet filtering did not.

Tables 2 and 3 show the paired t-test results for sharpness measurements in horizontal moving edge and vertical moving edge respectively.

TABLE 2

|  | ORIGINAL NOISE-FREE IMAGE | KW FILTER |
| --- | --- | --- |
| KW FILTER | $P > 0.05$ | — |
| WAVELET FILTER | $P < 0.001$ | $P < 0.001$ |
| KLT FILTER | $P < 0.001$ | $P < 0.001$ |

TABLE 3

|  | ORIGINAL NOISE-FREE IMAGE | KW FILTER |
| --- | --- | --- |
| KW FILTER | $P > 0.05$ | — |
| WAVELET FILTER | $P < 0.001$ | $P < 0.001$ |
| KLT FILTER | $P < 0.001$ | $P < 0.001$ |

Tables 2 and 3 shows that the sharpness of moving edges in the original noise-free image and the KW filtered image were not significantly different from one another since p-value is greater than 0.05. However, both KLT filtered image and Wavelet filtered image showed significant difference from KW filtered image as well as original noise-free image. So, it may be concluded that the sharpness loss caused by KW filter is insignificant while both KLT filter and Wavelet filter caused significant loss in moving edge sharpness.

Table 4 shows the RMS difference of noisy input image and filtered images from the original noise-free image:

TABLE 4

| UNFILTERED NOISY IMAGE | KW FILTERED IMAGE | WAVELET FILTERED IMAGE | KLT FILTERED IMAGE |
|---|---|---|---|
| 0.08 | 0.0162 | 0.0454 | 0.0380 |

From Table 4, it can be seen that RMS difference between unfiltered noisy image and original noise-free image is 0.08, which corresponds to the standard deviation of added noise. KW filter was able to bring this RMS difference from 0.08 to 0.0162, a reduction of almost 80%. The KW filtered image was closer on an RMS basis to the original image than both Wavelet filtered image and KLT filtered image with equivalent gain in SNR.

Example Results—Human Data

For the purpose of analyzing the effect of KW filter on MR cine images, images were acquired in vertical and horizontal long-axis and short-axis views in four healthy volunteers using steady-state free precession real-time cine on a 3.0 T MR scanner (MAGNETOM Trio, Siemens Healthcare, Germany). Imaging parameters were: TGRAPPA with parallel acceleration rate=5, 192×95 image matrix reconstructed (interpolated by zero padding to 192×144) from 192×19 acquired k-space matrix, 5 mm thick slice, flip angle=48°, temporal resolution=54.77 ms, TE/TR (Echo time/Repetition time)=1.25/2.83 ms, pixel bandwidth=1447 Hz/pixel, FOV=300×225 mm$^2$. A total of 256 images were acquired per image series over a 13.77 second acquisition during free-breathing. Also, for a single volunteer, images were acquired in vertical and horizontal long-axis and short-axis views with three different acceleration rates—rate 4, rate 5 and rate 6. A total of 256 images of size 192×144 were acquired per image series.

Temporal filter performance can be influenced by the number of frames in the series, especially when there is some temporal periodicity. An increasing number of frames that span additional cycles of motion (e.g., heart beats) increases the redundancy of information, enhancing the level of signal compression provided by the KLT. This was investigated in one series of cine images by varying the number of temporal frames that were filtered.

To evaluate the performance of the KW filter on human images, SNR gain and image sharpness were used as performance indices. Filtering performance of KW filter was compared to that of Wavelet filter and KLT filter in terms of edge sharpness for a matched value of SNR gain. This is explained in detail above.

To find the SNR of MR cine images, a subtraction method was implemented in an ROI enclosing the heart. To implement the subtraction method, a pair of image frames were identified that showed the least amount of variation between them in the ROI so that the difference between these two frames would yield predominantly noise in the ROI. To find the pair of frames with least amount of variation in the ROI, the pairwise correlation coefficients are computed, and then the pair of frames with the highest correlation is identified. Analyzing the pairwise correlation coefficients, the pair of most "similar" image frames may be identified. The noise-only difference image was then obtained by subtracting the ROIs of these two similar frames. The standard deviation of this noise-only difference image divided by √2 was used as an estimate of the noise standard deviation.

The mean signal value was obtained by calculating the mean value of the ROI for the particular pair of image frames chosen. Using the computed mean signal value and noise standard deviation, the SNR of the MR cine image was obtained as the ratio of the former to the latter. The method to compute edge sharpness for MR cine images is the same as the one used for phantom images, as described above.

To compare the performance of KW filter, Wavelet filter and KLT filter on human images, the following example steps were implemented (in same order):

1. SNR gain comparison of filters
   a. Higher parallel acceleration rates result in higher noise level. For a single volunteer data obtained with different acceleration rates (rate 4, rate 5, and rate 6), KW filter, Wavelet Filter and KLT filter were applied.
   b. SNR gain provided by the filters was calculated for all three acceleration rates (Refer section 4.1)
2. Sharpness comparison of filters
   a. For rate 5 data acquired in four healthy volunteers, the KW filter was applied to each volunteer data separately and SNR gain was computed.
   b. For each volunteer data, SNR gain of Wavelet filter was empirically matched to that of KW filter by increasing the adaptive Wavelet threshold (Refer section 3.4.1)
   c. Similarly, SNR gain of KLT filter was empirically matched to that of KW filter by discarding eigenimages in addition to those discarded using the MP Law cutoff (Refer section 3.4.2)
   d. After SNR gains of all three filters were matched for four rate 5 volunteer data, loss in edge sharpness caused by each filter with respect to original image was computed (Refer section 3.2)
3. SNR gain comparison for varying number of frames
   a. For a single rate 4 volunteer data with a total of 256 frames, a KW filter is applied to 32 frames, 64 frames, 128 frames and 256 frames of the image series separately
   b. SNR gain was computed for each frame length separately For sharpness measurements, the myocardial edge was chosen as it moves with the beating heart and thus shows temporal variation across image frames. Sharpness measurements are calculated and averaged over one cardiac cycle. Computing SNR gain for volunteer data acquired with different acceleration rates was done to evaluate filter performance with varying levels of image noise. A quantitative comparison of filter performance was also performed using the same approach described for the phantom experiments described above; the SNR gain for the three filters was matched, and image edge sharpness measured. In this manner, the degree of edge degradation for a given level of SNR gain could be quantitatively assessed and compared.

To analyze the effect of KW filter on images with varying noise, the cardiac image series of a single volunteer acquired using different acceleration rates (rate 4, rate 5 and rate 6) are considered. For all three acceleration rates, the SNR gain for KW filter is determined, KLT filter and Wavelet filter. For every acceleration rate, three views were considered; short axis view, 2 chamber view and 4 chamber view. The SNR gain was computed using the subtraction method previously described above.

Figure 12A:
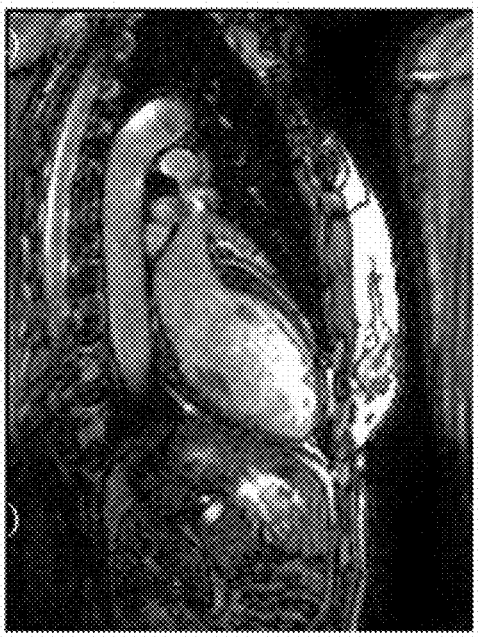
FIGS. 12A-12D illustrate a 2 chamber view of rate 4 volunteer data respectively showing a noisy input image, a KW filtered image, a Wavelet filtered image, and a KLT filtered image.
Figure 12B:
Figure 12C:
Figure 12D:
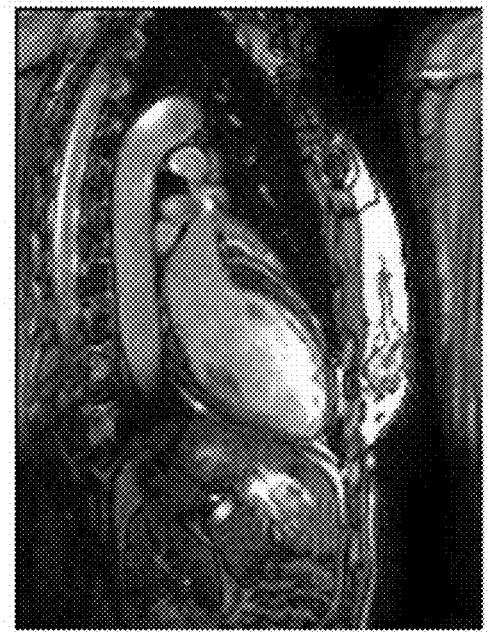
Figure 13A:
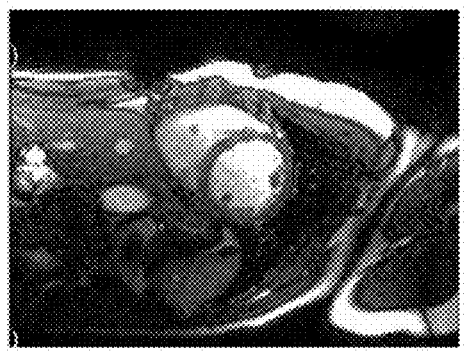
FIGS. 13A-13D illustrate a short axis view of rate 4 volunteer data respectively showing a noisy input image, a KW filtered image, a Wavelet filtered image, and a KLT filtered image.
Figure 13B:
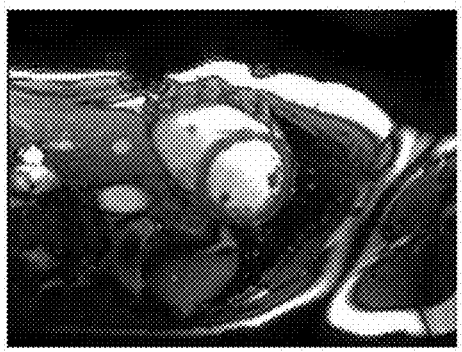
Figure 13C:
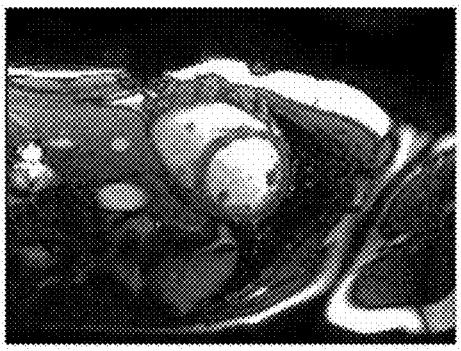
Figure 13D:
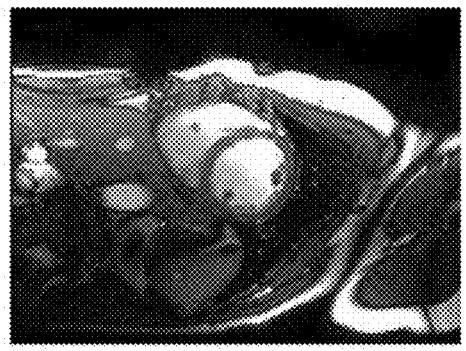
Figure 15:
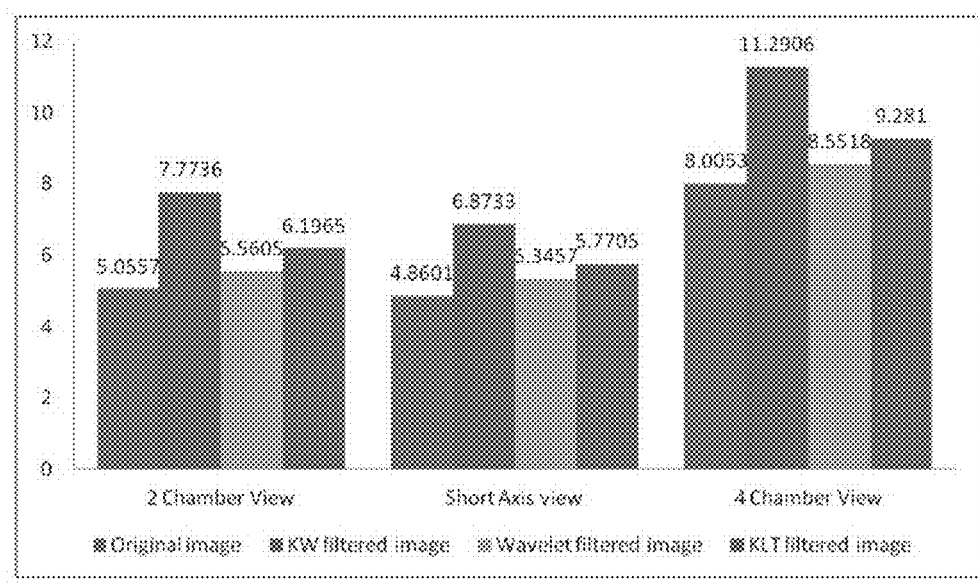
FIG. 15 illustrates a signal to noise ratio (SNR) gain of filters for single rate 4 volunteer data
Figure 16A:
FIGS. 16A-16D illustrate a 2 chamber view of rate 5 volunteer data respectively showing a noisy input image, a KW filtered image, a Wavelet filtered image, and a KLT filtered image.
Figure 16B:
Figure 16C:
Figure 16D:

With the above as an introduction, FIGS. 12A-12D illustrate a two chamber view of rate 4 volunteer data showing a noisy input image (FIG. 12A); KW filtered image (FIG. 12B); Wavelet filtered image (FIG. 12C); and KLT filtered image (FIG. 12D). FIGS. 13A-13D illustrate a short axis view of rate 4 volunteer data showing a noisy input image (FIG. 13A); KW filtered image (FIG. 13B); Wavelet filtered image (FIG. 13C); and KLT filtered image (FIG. 13D). FIGS. 14A-14D illustrate a 4 chamber view of rate 4 volunteer data showing a noisy input image (FIG. 14A); KW filtered image (FIG. 14B); Wavelet filtered image (FIG. 14C); and KLT filtered image (FIG. 14D). FIGS. 12, 13 and 14 show the original and filtered images for a single rate 4 volunteer data. For rate 4 image series, SNR gain provided by the filters is summarized in the graph shown in FIG. 15, which illustrates the SNR gain of filters for single rate 4 volunteer data From the FIG. 15, it can be seen that KW filter provided higher SNR gain than the KLT and Wavelet filters in these three image series acquired in a single volunteer using rate 4 acceleration. SNR gain was computed using the method specified in section 4.1.

FIGS. 16A-16D illustrate a 2 chamber view of rate 5 volunteer data showing noisy input image; a KW filtered image; Wavelet filtered image, and KLT filtered image, respectively. FIGS. 17A-17D illustrate a short axis view of rate 5 volunteer data showing a noisy input image; a KW filtered image; a Wavelet filtered image; and KLT filtered image, respectively. FIGS. 18A-18D illustrate a 4 chamber view of rate 5 volunteer data showing a noisy input image; a KW filtered image; a Wavelet filtered image; and KLT filtered image, respectively. FIGS. 16, 17 and 18 show the original and filtered images for a single rate 5 volunteer data. For the single rate 5 volunteer data, SNR gain for all three filters was computed.

Figure 19:
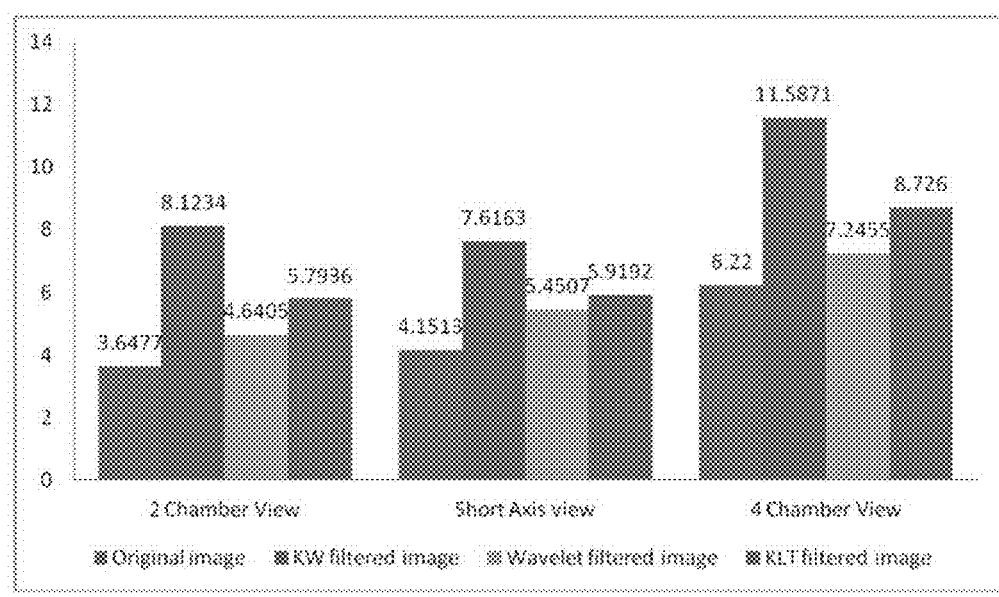
FIG. 19. SNR gain of filters for single rate 5 volunteer data.
Figure 21A:
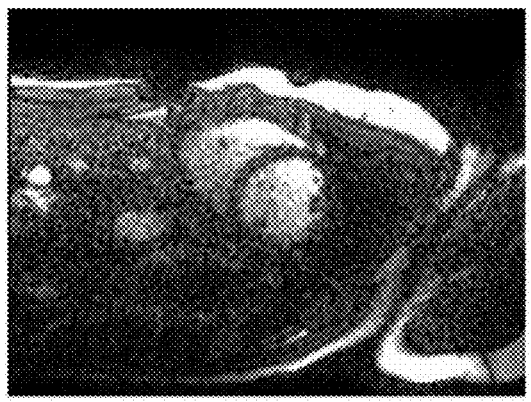
FIGS. 21A-21D illustrate a short axis view of rate 6 volunteer data respectively showing a noisy input image, a KW filtered image, a Wavelet filtered image, and a KLT filtered image.
Figure 21B:
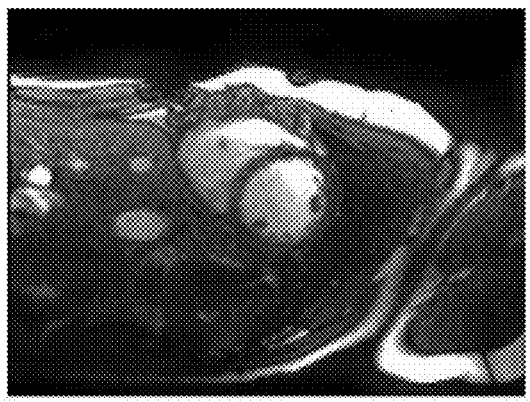
Figure 21C:
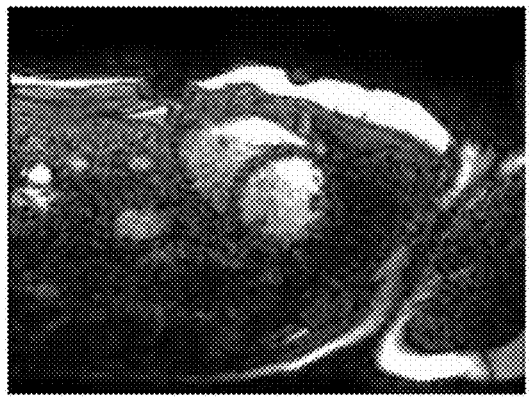
Figure 21D:
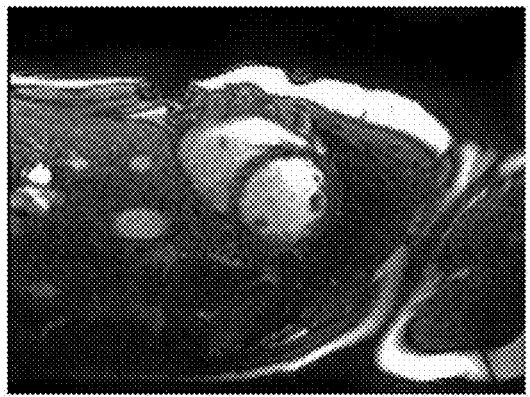
Figure 22A:
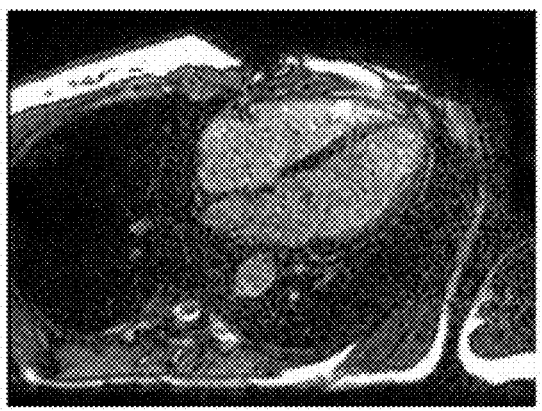
FIGS. 22A-22D illustrate a 4 chamber view of rate 6 volunteer data respectively showing a noisy input image, a KW filtered image, a Wavelet filtered image, and a KLT filtered image.
Figure 22B:
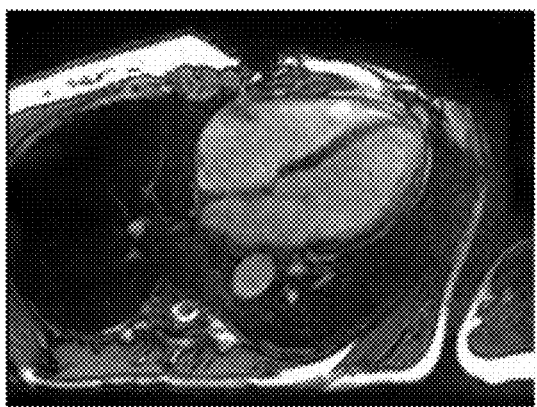
Figure 22C:
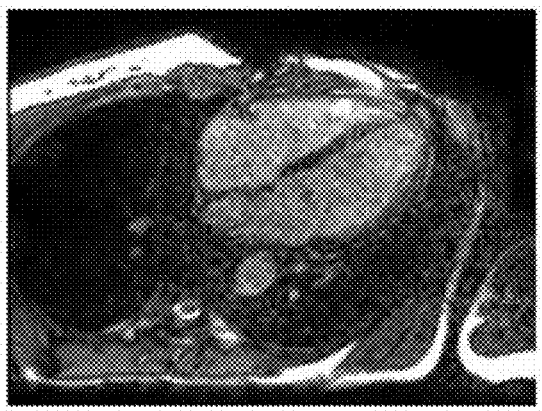
Figure 22D:
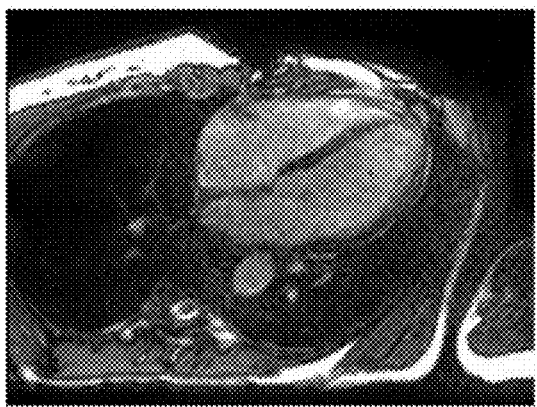

FIG. 19 summarizes the SNR gain results of the three filters for rate 5 data. FIG. 19 shows that KW filter provides better SNR results compared to KLT filter and Wavelet filter for single rate 5 data. By comparing FIG. 18 and FIG. 19, the KW filter provides better SNR gain for rate 5 data than for rate 4 data. This is because noise level in rate 5 images is higher than in rate 4 images. This causes the MP Law method to discard more noise-only eigenimages for rate 5 data than for rate 4 data, leading to better SNR gain results.

Figure 23:
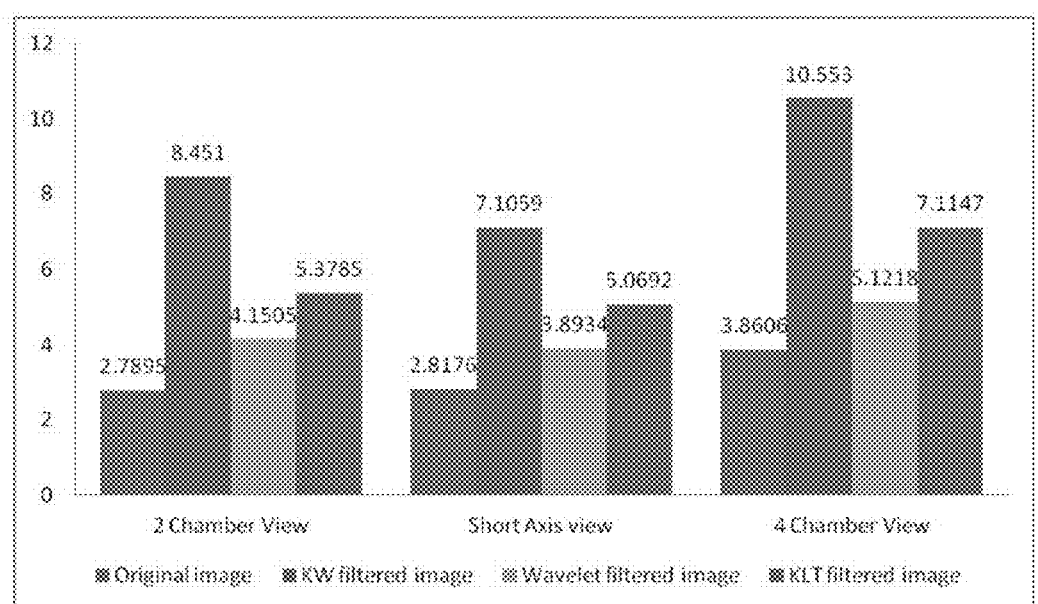
FIG. 23 illustrates a SNR gain of filters for single rate 6 volunteer data.
Figure 25A:
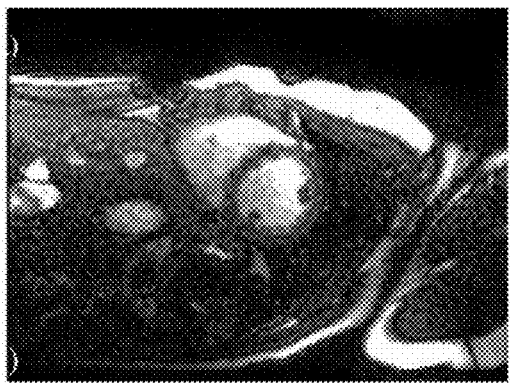
FIGS. 25A-25D illustrate a short axis view of rate 5 volunteer data respectively showing a noisy input image, a KW filtered image, a Wavelet filtered image, and a KLT filtered image; SNR gain of all three filters were matched.
Figure 25B:
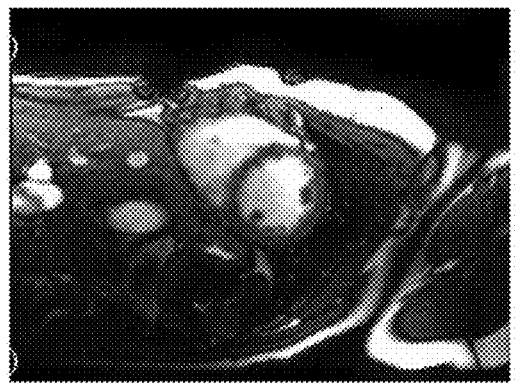
Figure 25C:
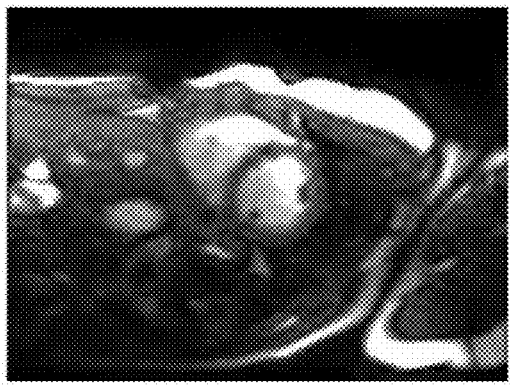
Figure 25D:
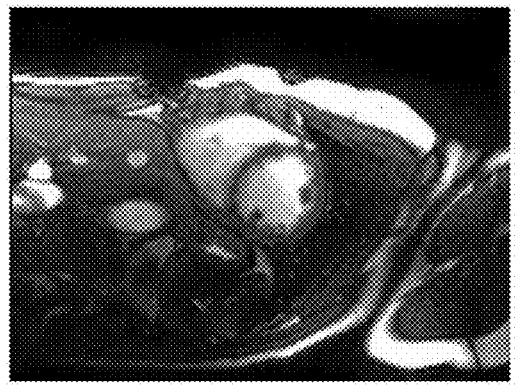

FIGS. 20A-20D illustrate a 2 chamber view of rate 6 volunteer data showing a noisy input image; a KW filtered image; a Wavelet filtered image; and KLT filtered image, respectively. FIGS. 21A-21D illustrate a short axis view of rate 6 volunteer data showing a noisy input image; a KW filtered image; a Wavelet filtered image; and KLT filtered image, respectively. FIGS. 22A-22D illustrate a 4 chamber view of rate 6 volunteer data showing a noisy input image; a KW filtered image; a Wavelet filtered image; and KLT filtered image, respectively. FIGS. 20, 21 and 22 show the original and filtered images for a single rate 6 volunteer data. FIG. 23 provides SNR gain results of all three filters for a single rate 6 volunteer data. From FIG. 23, it can be seen that KW filter provides better SNR gain than KLT filter and Wavelet filter for a single rate 6 volunteer data. Also, it has to be noted that SNR gain provided by KW filter for rate 6 data is superior to the gain provided for rate 5 and rate 4 data. This is because noise level in rate 6 data is higher than in rate 5 and rate 4 data, which causes MP Law to discard more noise-only eigenimages for rate 6 data. Therefore, SNR gain for rate 6 data is higher.

In summary, these experiments have demonstrated that KW filter provides better SNR results than Wavelet filter and KLT filter for all three acceleration rates (rate 4, rate 5, rate 6). Also, SNR gain provided by KW filter increased with increasing acceleration rate, i.e., with increasing noise level.

The previous section shows the SNR gain provided by the three filters for images acquired using various acceleration rates. However, to have a basis for comparison, one parameter is set constant and another parameter is evaluated. This was done by following the same procedure that was applied to the phantom images as described above; SNR gain was set to the same level for each filter and the loss in edge sharpness was measured. For comparison purposes, acceleration rate 5 images from four healthy volunteers are considered.

SNR gain of KLT filter was matched to that of KW filter by varying the number of noise-only eigenimages that were discarded. On the other hand, SNR gain of Wavelet filter was matched to that of KW filter by varying Chang's adaptive Wavelet threshold. After SNR gain of all three filters was matched, edge sharpness of the myocardial wall was computed using the same method that was used in the case of phantom images. For each of the three views (short axis, 4-chamber, and 2-chamber), myocardial edge sharpness was averaged over a set of frames representing one cardiac cycle. The edge sharpness measurement was also averaged over four volunteers, to get a single measurement value for each view.

For rate 5 images of four volunteers considered, the average SNR gain provided by the KW filter is shown in Table 5, which shows the average SNR gain of KW filter for four rate 5 volunteers.

TABLE 5

| TYPE OF VIEW | SNR OF ORIGINAL IMAGE | SNR OF KW FILTERED IMAGE |
| --- | --- | --- |
| 2 CHAMBER | 3.7019 | 8.1456 |
| SHORT AXIS | 4.0276 | 7.3448 |
| 4 CHAMBER | 6.3002 | 12.2897 |

For each volunteer data, the SNR gain of the Wavelet and KLT filters were matched to the SNR gain of KW filter separately for each of the three views prior to measuring edge sharpness.

Figure 27:
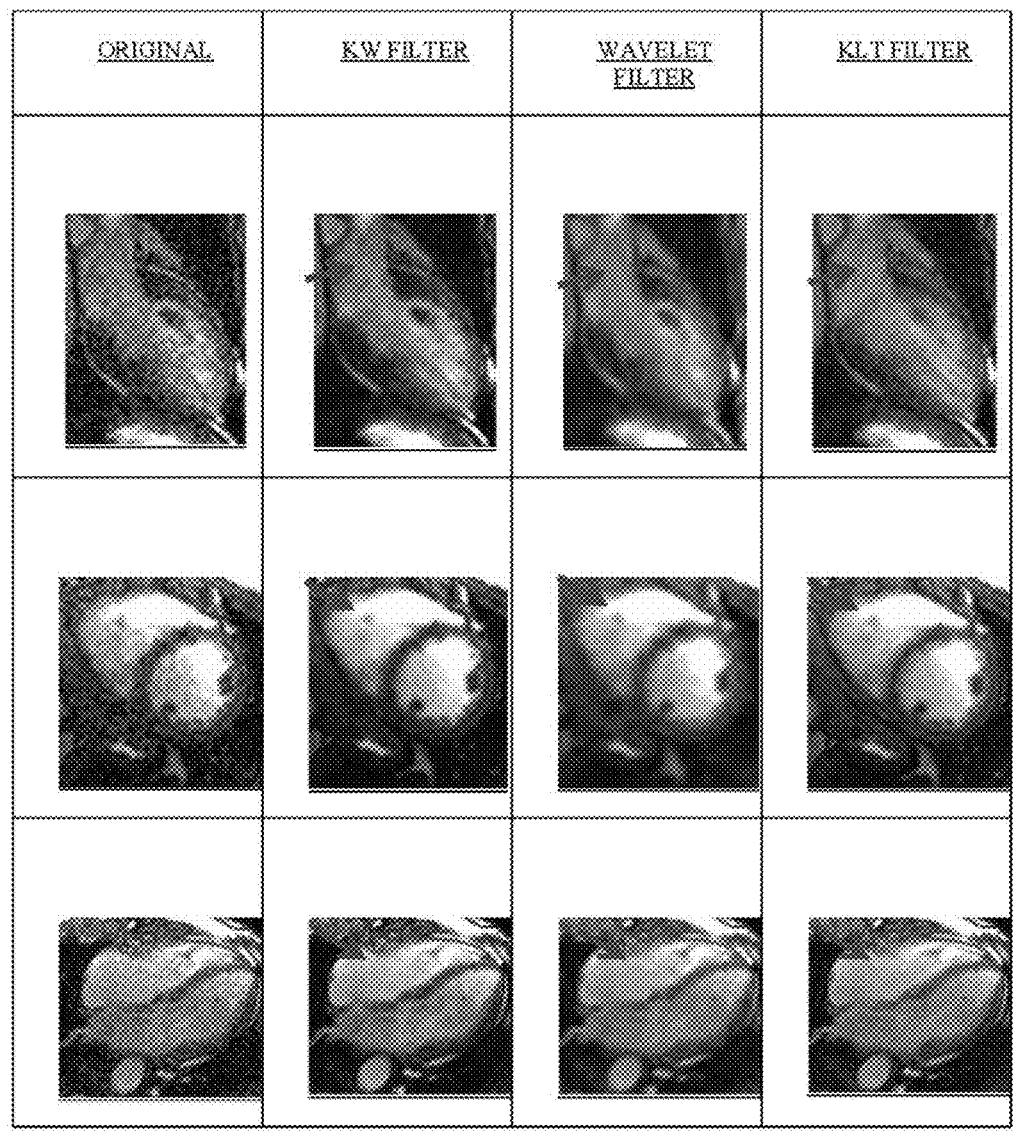
FIG. 27 illustrates the effect of different filters on myocardial edge sharpness with a focus on the heart.

FIGS. 24, 25 and 26 show filtering results of rate 5 volunteer data after SNR gain of all three filters were matched. FIGS. 24A-24D illustrate a 2 chamber view of rate 5 volunteer data showing a noisy input image; a KW filtered image; a Wavelet filtered image; and KLT filtered image, respectively; SNR gain of all three filters were matched. FIGS. 25A-25D illustrate a short axis view of rate 5 volunteer data showing a noisy input image; a KW filtered image; a Wavelet filtered image; and KLT filtered image, respectively; SNR gain of all three filters were matched. FIGS. 26A-26D illustrate a 4 chamber view of rate 5 volunteer data showing a noisy input image; a KW filtered image; a Wavelet filtered image; and KLT filtered image, respectively; SNR gain of all three filters were matched FIG. 27 focuses on the heart to compare the sharpness performance of the three filters for a similar value of SNR gain to show the effect of different filters on myocardial edge sharpness. In FIG. 27, the arrows point to the myocardial edge in each view. By visually looking at the myocardial edge in each filtered image, it is evident that KW filter provides better sharpness results when compared to KLT filter and Wavelet filter for a matched value of SNR gain.

Figure 28:
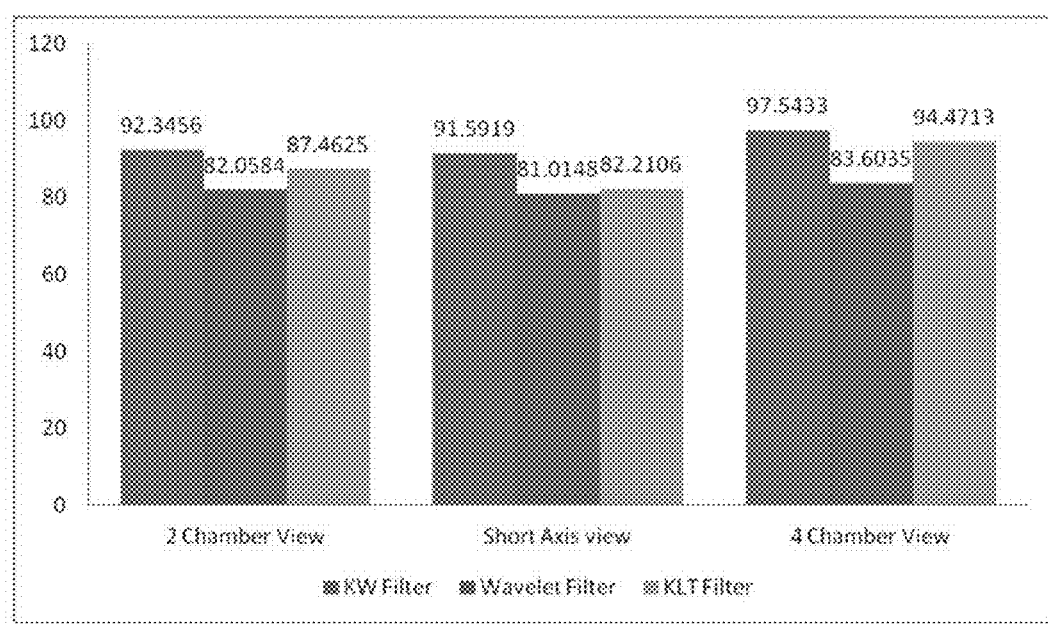
FIG. 28 illustrates an edge sharpness measurement for each filter shown as percentage of sharpness of original image.

FIG. 28 illustrates sharpness measurements of all three filters averaged over four rate 5 volunteers. The edge selected to compute sharpness was the myocardial edge (the interface between bright blood and dark heart muscle). The identical edge was evaluated for each of the different filtered image series. Sharpness measurement is presented as percentage of sharpness of the original image. From FIG. 28, it can be seen that KW filter shows better sharpness performance compared to Wavelet filter and KLT filter. For each view, % loss in sharpness caused by KW filter is lesser than both Wavelet filter and KLT filter for a similar value of SNR gain.

To analyze the significance of difference in sharpness measurements between the original and filtered human images, a paired t-test may be used. Procedure and assumptions to perform t-test were identical to those described in chapter 3 for phantom images.

TABLE 6

|  | ORIGINAL IMAGE | KW FILTER |
|---|---|---|
| KW FILTER | $P < 0.05$ | — |
| WAVELET FILTER | $P < 0.001$ | $P < 0.001$ |
| KLT FILTER | $P < 0.001$ | $P < 0.001$ |

Table 6 provides the t-test results for sharpness measurements on all three views of all four rate 5 volunteers combined together. It can be seen that measurements of all three filters—KW filter, KLT filter and Wavelet filter are significantly different from one another as well as from the original image. It has to be noted that sharpness of KW filtered image shows significant difference from original image in human data, but the difference in phantom data is insignificant.

To analyze the performance of KW filter on image series with varying frame length, a single rate 4 volunteer data having a total of 256 frames is considered. KW filter was applied to 32 frames, 64 frames, 128 frames and 256 frames of the image series separately.

TABLE 7

| ORIGINAL | 32 FRAMES | 64 FRAMES | 128 FRAMES | 256 FRAMES |
|---|---|---|---|---|
| 4.888 | 5.908 | 5.956 | 6.143 | 6.559 |

KW filter demonstrated higher SNR gain when more images were included. SNR gain of KW filter for a 256 image series was 13.31% higher than for a 32 image series. This is because the level of temporal redundancy, and hence the performance of the KLT filter, increases with increase in series length. This tradeoff can be exploited in situations where longer series of images can be acquired.

Figure 29:
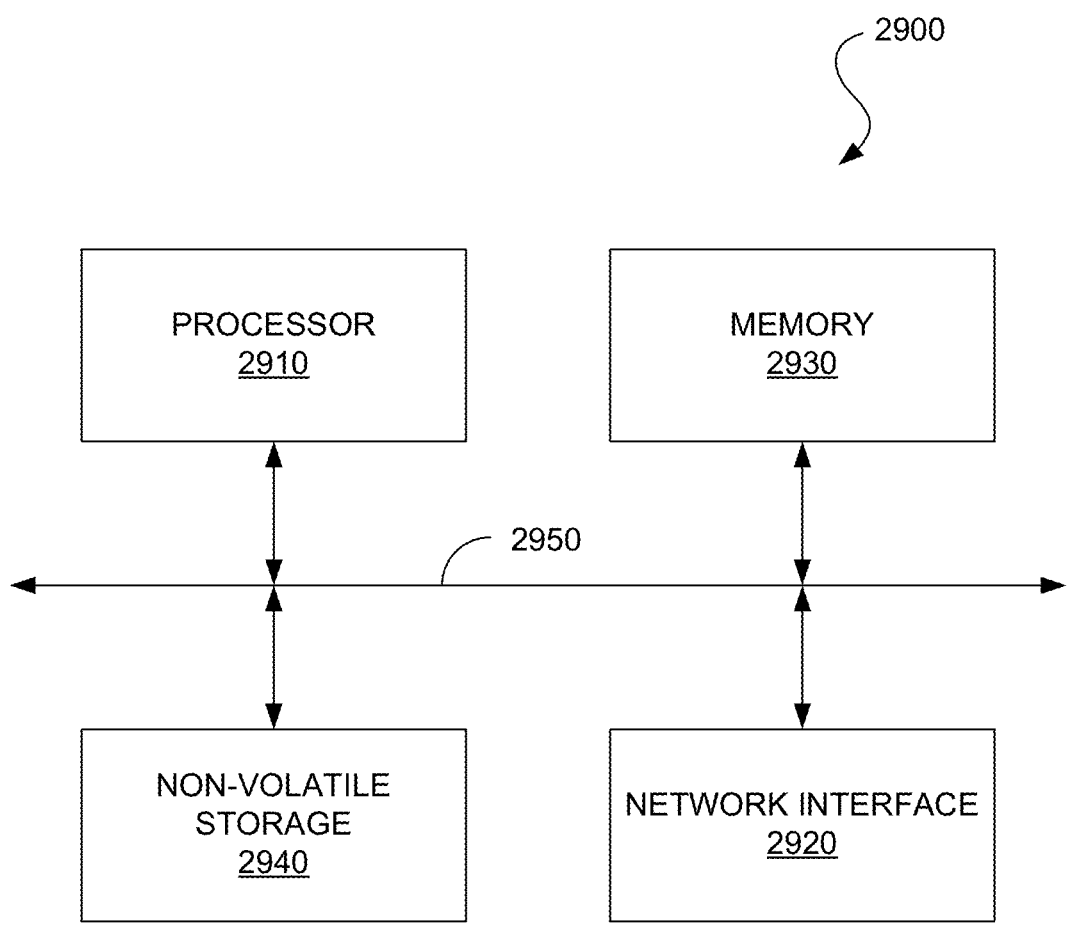
FIG. 29 illustrates an example computing device.

FIG. 29 is a hardware block diagram of a general-purpose computer 2900 that can be used to implement one or more of the components of the filters disclosed herein. The computer 2900 contains a number of components that are well known in the art of call center software, including a processor 2910, a network interface 2920, memory 2930, and non-volatile storage 2940. Examples of non-volatile storage include, for example, a hard disk, flash RAM, flash ROM, EEPROM, etc. These components are coupled via a bus 2950. The memory 2930 contains instructions which, when executed by the processor 2910, implement the methods and systems disclosed herein. Omitted from FIG. 29 are a number of conventional components, known to those skilled in the art that are unnecessary to explain the operation of the system 2900.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternative embodiments are also included within the scope of the disclosure. In these alternative embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What is claimed:

1. A method of providing a Karhunen-Love Transform Wavelet (KW) Filter to suppress random noise in an image series, comprising:
 applying a Karhunen-Loeve Transform (KLT) to the image series to compress signal information into a finite set of frames, the KLT being applied to a temporal domain to convert a temporal series of frames into a series of eigen-images having eigenvalues, wherein the signal information is concentrated into a subset of eigenimages in accordance with their respective eigenvalues;
 discarding substantially noise-only frames;
 applying a Wavelet filter with an adaptive threshold to remaining frames; and
 applying an inverse KLT to obtain the de-noised image series.

2. The method of claim 1, wherein the temporal series of frames comprises M frames each having N pixels, the method further comprising:
 representing the image series by a M×N matrix I, wherein each row corresponds to an image frame;
 representing a M×M empirical temporal covariance matrix $R=II^T/N$ that has M eigenvalues ($\lambda_1 \leq \lambda_2 \leq \ldots \leq \lambda_M$) and a corresponding eigenvector matrix E, with eigenvectors as rows; and
 applying E to I to determine an eigenimage matrix X.

3. The method of claim 2, further comprising sorting rows of the matrix X by their eigenvalues, wherein smaller eigenvalues contain less signal information, and wherein relatively eigenvalues contain more signal information.

4. The method of claim 1, further comprising removing noise-only eigenimages that substantially contain noise by applying the MP Law.

5. The method of claim 4, wherein the noise-only eigenimages follow a probability distribution function defined by:

$$p(\lambda) = \frac{1}{2\pi\sigma^2\lambda a}\sqrt{\max(0, (\lambda\max - \lambda)(\lambda - \min)},$$

and $$\lambda\max, \min = \sigma^2\left(1 \pm \sqrt{\alpha}\right)^2,$$

wherein $\sigma^2$ is a noise variance, $\lambda$max is a maximum eigenvalue of the noise-only eigenimages, $\lambda$min is a minimum eigenvalue of the noise-only eigenimages, and $\alpha=(M-r)/N$ where M is the total number of images, r is the cutoff, i.e. M−r is the number of noise only eigenimages, N is the pixel number per image.

6. The method of claim 5, estimating the noise variance, further comprising:
selecting an eigenimage cutoff r;
determining $\sigma^2$ as an average of first M−r eigenvalues;
varying a pixel number N representing pixels in each frame to maximize a goodness-of-fit (GOF) between the MP-law probability distribution and the empirical probability distribution first M−r eigenvalues using a Kolmogorov-Smirnov (KS) Test; and
repeating the selecting, determining and varying until a global maximum of GOF is found at an eigenimage cutoff $r=r_0$ and a pixel number $N=N_0$.

7. The method of claim 6, wherein first M−$r_0$ eigenimages are noise-only eigenimages.

8. The method of claim 6, further comprising determining $\sigma^2$ as an average of first M−r eigenvalues using the relationship $$\sigma^2 = \int_{\lambda\min}^{\lambda\max}\lambda p(\lambda)d\lambda.$$

9. The method of claim 1, discarding substantially noise-only frames by defining a cutoff that results in noise suppression substantially without reducing the signal information.

10. The method of claim 1, further comprising applying Wavelet filtering using a soft thresholding method wherein the adaptive threshold is directly proportional to noise variance and inversely proportional to signal standard deviation of each eigenimage.

11. The method of claim 10, wherein the adaptive threshold applies relatively stronger filtering to eigenimages with low signal information and relatively weaker filtering to eigenimages with higher signal information.

12. The method of claim 1, further comprising applying a Wavelet transform as a n-level Wavelet transform that is applied to each remaining eigenimage after noise-only eigenimages are discarded.

13. The method of claim 12, further comprising applying a 2-D Wavelet transform to divide an image into an approximation that comprises one low frequency component and details that comprise three high frequency components.

14. The method of claim 13, wherein the adaptive threshold removes noise by thresholding only the Wavelet coefficients of sub-bands of the details while keeping low resolution coefficients of the approximation unaltered.

15. The method of claim 13, further comprising:
for each detail coefficient, determining the adaptive threshold in accordance with the relationship:

$$T(\sigma_x) = \frac{\sigma^2}{\sigma_x},$$

wherein $\sigma^2$ is a noise variance that is calculated and averaged over all noise-only eigenimages, wherein signal standard deviation $\sigma_x$ of each sub-band of the details is determined in accordance with the relationship:

$$\sigma_X = \sqrt{\max(\sigma_Y^2 - \sigma^2, 0)},$$

wherein $\sigma_Y^2$ is the variance of pixel values in a sub-band that include both signal information and noise.

16. The method of claim 12, further comprising determining and applying the adaptive threshold to each of the details, wherein a predetermined number of n thresholds are obtained for each eigenimage in accordance with n-level Wavelet transform.

17. The method of claim 1, wherein the adaptive threshold provides additional suppression of noise beyond that which is provided by the KLT.

18. A method of providing a Karhunen-Love Transform Wavelet (KW) Filter to suppress random noise in an image series, comprising:
applying a Karhunen-Loeve Transform (KLT) to the image series to compress signal information into a finite set of frames;
discarding substantially noise-only frames;
applying a Wavelet filter with an adaptive threshold to remaining frames; and
applying an inverse KLT to obtain the de-noised image series,
wherein the inverse KLT is defined by the relationship:

$$D = W^{-1}T,$$

wherein $D=\{d_{ij}\}_{i,j}$ represents a matrix of de-noised eigenimages, $W^{-1}$ represents a 2D dyadic inverse Wavelet transform operator and $T=\{t_{ij}\}_{i,j}$ represents a matrix of Wavelet coefficients after application of the adaptive threshold.

19. The method of claim 18, wherein an output image series obtained after applying the inverse KLT is represented by a matrix $F=\{f_{ij}\}_{i,j}$ and is represented by the relationship:

$$F = E^{-1}D,$$

wherein $E^{-1}$ represents an inverse KLT operator.

20. A method of providing of suppressing random noise in an image series with M frames, comprising:
applying a transform to the image series to convert a temporal series of frames into a series of eigenimages having eigenvalues;
applying a probability distribution function to determine noise-only eigenimages in the series of eigenimages to determine a set of remaining eigenimages;
applying a wavelet filter with an adaptive threshold to each eigenimage in the set of eigenimages to define the wavelet filter strength for each of the eigenimages in the set of eigenimages; and
applying an inverse transform to obtain a de-noised image series.

21. The method of claim 20, wherein the transform comprises a temporal filtering technique.

22. The method of claim 21, wherein the temporal filtering technique is a Karhunen-Loeve Transform (KLT).

23. The method of claim 21, wherein the temporal filtering technique is a singular value decomposition (SVD).

24. The method of claim 20, further comprising determining the adaptive threshold based on a noise variance and standard deviation of an image.

25. The method of claim 20, wherein the probability distribution function is tuned by two fitting parameters, the number of pixels N, and the eigenimage cutoff r.

26. The method of claim 25, wherein the probability distribution function is MP-law distribution, defined by a noise variance, a maximum eigenvalue of the noise-only eigenimages, a minimum eigenvalue of the noise-only eigenimages, and wherein the fitting parameter adjusts the number of pixels per frame.

27. The method of claim 20, wherein the probability distribution function is replaced by a method that is adapted to identify the eigenimages that can be removed without affecting the signal image series.

28. The method of claim 25, discarding substantially noise-only eigenimages by defining a cutoff that results in noise suppression substantially without reducing the signal information.

29. The method of claim 27, further comprising:
selecting an eigenimage cutoff r for the image series with M frames;
determining the noise variance as an average of first M−r eigenimages;
varying a pixel number N representing pixels in each frame to maximize a goodness-of-fit (GOF) between the probability distribution and first M−r eigenvalues; and
repeating the selecting, determining and varying until a global maximum of GOF is found at an eigenimage cutoff $r=r_0$ and a pixel number $N=N_0$.

30. The method of claim 28, wherein first $M-r_0$ eigenimages are noise-only eigenimages.

* * * * *